US011320591B2

(12) United States Patent
Chang et al.

(10) Patent No.: US 11,320,591 B2
(45) Date of Patent: May 3, 2022

(54) METHODS AND APPARATUSES FOR CASTING POLYMER PRODUCTS

(71) Applicant: Magic Leap, Inc., Plantation, FL (US)

(72) Inventors: Chieh Chang, Cedar Park, TX (US); Christophe Peroz, San Francisco, CA (US); Sharad D. Bhagat, Austin, TX (US); Michael Anthony Klug, Austin, TX (US); Charles Scott Carden, Austin, TX (US); Roy Matthew Patterson, Hutto, TX (US); Matthew S. Shafran, Fletcher, NC (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/321,837

(22) Filed: May 17, 2021

(65) Prior Publication Data

US 2021/0271025 A1 Sep. 2, 2021

Related U.S. Application Data

(63) Continuation of application No. 16/654,540, filed on Oct. 16, 2019, now Pat. No. 11,009,661.
(Continued)

(51) Int. Cl.
*G02B 6/132* (2006.01)
*B29D 11/00* (2006.01)
(Continued)

(52) U.S. Cl.
CPC ........ *G02B 6/132* (2013.01); *B29D 11/00663* (2013.01); *B29D 11/00721* (2013.01);
(Continued)

(58) Field of Classification Search
CPC .... G02B 6/102; G02B 6/132; G02B 27/0172; B29C 35/0888; B29D 11/00721
See application file for complete search history.

(56) References Cited

U.S. PATENT DOCUMENTS 3,754,848 A    8/1973 Choate
4,017,183 A    4/1977 Lenz et al.
(Continued)

FOREIGN PATENT DOCUMENTS

CN    1108999 A    9/1995
CN    1221371 A    6/1999
(Continued)

OTHER PUBLICATIONS

EP Extended European Search Report in Application No. 18766926.2, dated Feb. 19, 2020, 9 pages.
(Continued)

*Primary Examiner* — Daniel Petkovsek
(74) *Attorney, Agent, or Firm* — Fish & Richardson P.C.

(57) ABSTRACT

In an example method of forming a waveguide film, a photocurable material is dispensed into a space between a first mold portion and a second mold portion opposite the first mold portion. Further, a relative separation between a surface of the first mold portion with respect to a surface of the second mold portion opposing the surface of the first mold portion is adjusted. The photocurable material in the space is irradiated with radiation suitable for photocuring the photocurable material to form a cured waveguide film. Concurrent to irradiating the photocurable material, the relative separation between the surface of the first mold portion and the surface of the second mold portion is varied and/or an intensity of the radiation irradiating the photocurable material is varied.

17 Claims, 24 Drawing Sheets

Related U.S. Application Data

(60) Provisional application No. 62/746,426, filed on Oct. 16, 2018.

(51) Int. Cl.
  *G02B 6/10* (2006.01)
  *G02B 27/01* (2006.01)
  *B29C 35/08* (2006.01)
  *G02B 6/12* (2006.01)

(52) U.S. Cl.
  CPC ........ *B29D 11/00788* (2013.01); *G02B 6/102* (2013.01); *B29C 35/0888* (2013.01); *G02B 27/0172* (2013.01); *G02B 2006/1219* (2013.01)

(56) References Cited

U.S. PATENT DOCUMENTS

| | | | |
|---|---|---|---|
| 5,269,978 | A | 12/1993 | Umetsu et al. |
| 5,415,816 | A | 5/1995 | Buazza et al. |
| 5,744,357 | A | 4/1998 | Wang et al. |
| 6,206,673 | B1 | 3/2001 | Lipscomb et al. |
| 7,029,607 | B2 | 4/2006 | Shimizu et al. |
| 9,194,700 | B2 | 11/2015 | Kast et al. |
| 9,373,604 | B2 | 6/2016 | Yu et al. |
| 11,009,661 | B2 * | 5/2021 | Chang .................... G02B 6/132 |
| 2001/0045676 | A1 | 11/2001 | Winterton et al. |
| 2002/0115002 | A1 | 8/2002 | Bailey et al. |
| 2003/0031116 | A1 | 2/2003 | Takeda et al. |
| 2003/0169400 | A1 | 9/2003 | Buazza et al. |
| 2003/0218803 | A1 | 11/2003 | Nakabayashi |
| 2004/0222539 | A1 | 11/2004 | Hagmann et al. |
| 2005/0158003 | A1 | 7/2005 | Ohtsu et al. |
| 2007/0037897 | A1 | 2/2007 | Wang et al. |
| 2007/0060849 | A1 | 3/2007 | Bluman |
| 2007/0104440 | A1 | 5/2007 | Kim et al. |
| 2007/0188837 | A1 | 8/2007 | Shimizu et al. |
| 2008/0090155 | A1 | 4/2008 | Stewart et al. |
| 2008/0099941 | A1 | 5/2008 | Suehira et al. |
| 2010/0059914 | A1 | 3/2010 | Cherala et al. |
| 2010/0078854 | A1 | 4/2010 | Berggren et al. |
| 2011/0089590 | A1 | 4/2011 | Decusatis et al. |
| 2011/0097827 | A1 | 4/2011 | Hatano et al. |
| 2012/0161367 | A1 | 6/2012 | Kim et al. |
| 2013/0162997 | A1 | 6/2013 | Kast et al. |
| 2013/0221549 | A1 | 8/2013 | Eguro et al. |
| 2013/0300011 | A1 | 11/2013 | Fujimoto |
| 2013/0320589 | A1 | 12/2013 | Fujita |
| 2014/0239529 | A1 | 8/2014 | Tan et al. |
| 2014/0319707 | A1 | 10/2014 | Watanabe et al. |
| 2015/0054185 | A1 | 2/2015 | Watanabe |
| 2015/0276995 | A1 | 10/2015 | Nomura |
| 2016/0031151 | A1 | 2/2016 | Tan et al. |
| 2016/0039122 | A1 | 2/2016 | Wippermann et al. |
| 2016/0056126 | A1 | 2/2016 | Yu et al. |
| 2016/0339626 | A1 | 11/2016 | Truskett et al. |
| 2017/0315346 | A1 | 11/2017 | Tervo et al. |
| 2018/0264691 | A1 | 9/2018 | Chang et al. |
| 2019/0111642 | A1 | 4/2019 | Chang et al. |

FOREIGN PATENT DOCUMENTS

| | | |
|---|---|---|
| CN | 1276916 A | 12/2000 |
| CN | 101426638 A | 5/2009 |
| CN | 107249868 A | 10/2017 |
| EP | 0191623 A2 | 8/1986 |
| GB | 1101202 | 1/1968 |
| JP | 2006202920 A | 8/2006 |
| JP | 2007305895 A | 11/2007 |
| JP | 2008-296450 A | 12/2008 |
| JP | 2009200345 A | 9/2009 |
| JP | 2010000754 A | 1/2010 |
| JP | 2010269466 A | 12/2010 |
| JP | 2011051328 A | 3/2011 |
| JP | 2011176321 A | 9/2011 |
| JP | 2012131229 A | 7/2012 |
| JP | 2012518562 A | 8/2012 |
| JP | 2012213984 A | 11/2012 |
| JP | 2013058517 A | 3/2013 |
| JP | 2013075379 A | 4/2013 |
| JP | 2016031952 A | 3/2016 |
| KR | 101005583 B1 | 1/2011 |
| WO | WO 2013/153613 | 10/2013 |

OTHER PUBLICATIONS

EP Office Action in European Appln. No. 18766926.2, dated Feb. 2, 2021, 8 pages.

EP Partial Supplementary European Search Report in Application No. 18868789.1, dated Nov. 18, 2020, 15 pages.

PCT International Search Report and Written Opinion for International Appln. No. PCT/US2018/022642, dated Jun. 6, 2018, 15 pages.

PCT International Search Report and Written Opinion in International Appln. No. PCT/US2018/056326, dated Feb. 15, 2019, 22 pages.

PCT International Search Report and Written Opinion in International Appln. No. PCT/US2019/056557, dated Jan. 10, 2020, 12 pages.

EP Extended European Search Report in European Appln No. 19872349.6, dated Nov. 19, 2021, 10 pages.

Office Action in Japanese Appln. No. 2019-550227, dated Nov. 29, 2021, 10 pages (with English translation).

CN Office Action in Chinese Appln. No. 201880067513.0, dated Oct. 20, 2021, 14 pages (with English translation).

Office Action in Chinese Appln. No. 201980082616.9, dated Jan. 7, 2022, 10 pages (with English translation).

* cited by examiner

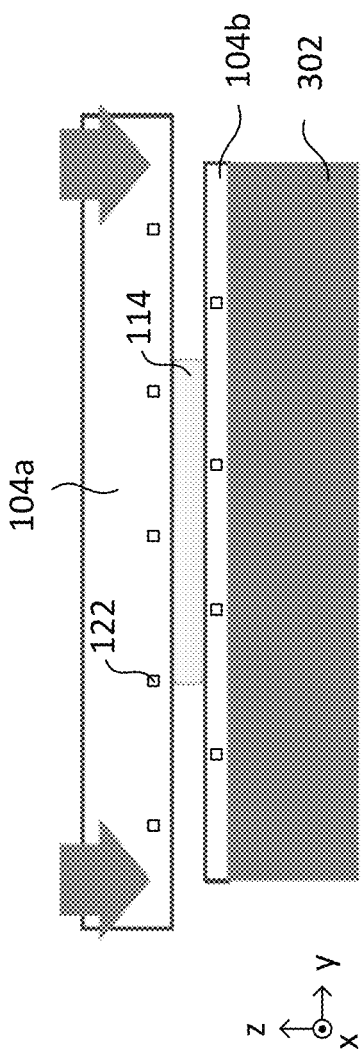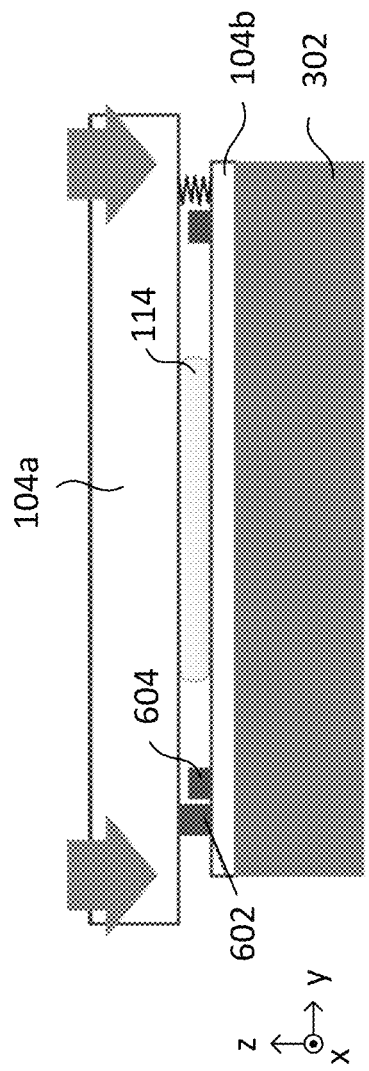

METHODS AND APPARATUSES FOR CASTING POLYMER PRODUCTS

CROSS-REFERENCE TO RELATED APPLICATIONS

This application is a continuation of U.S. patent application Ser. No. 16/654,540, entitled "Methods and Apparatuses for Casting Polymer Products," filed Oct. 16, 2019, now U.S. Pat. No. 11,009,661, which claims the benefit under 35 U.S.C. § 119(e) of U.S. Patent Application No. 62/746,426, entitled "Methods and Apparatuses for Casting Polymer Products," filed Oct. 16, 2018, which are incorporated herein by reference in their entirety.

TECHNICAL FIELD

This disclosure relates to optical polymer films and methods for producing the same.

BACKGROUND

Optical imaging systems, such as wearable imaging headsets, can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

In some cases, an eyepiece can be patterned (e.g., with one or more light diffractive nanostructures), such that it projects an image according to a particular focal depth. For an example, to a user viewing a patterned eyepiece, the projected image can appear to be a particular distance away from the user.

Further, multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

To improve the quality of a projected image, an eyepiece can be constructed such that unintended variations in the eyepiece are eliminated, or otherwise reduced. For example, an eyepiece can be constructed such that it does not exhibit any wrinkles, uneven thicknesses, or other physical distortions that might negatively affect the performance of the eyepiece.

SUMMARY

System and techniques for producing polymer films are described herein. One or more of the described implementations can be used to produce polymer film in a highly precise, controlled, and reproducible manner. The resulting polymer films can be used in a variety of variation-sensitive applications in which extremely tight tolerances on film dimensions are desired. For instance, the polymer films can be used in optical applications (e.g., as a part of eyepieces in an optical imaging system) in which material homogeneity and dimensional constraints are on the order of optical wavelengths or smaller.

In general, polymer films are produced by enclosing a photocurable material (e.g., a photopolymer or light-activated resin that hardens when exposed to light) between two molds, and curing the material (e.g., by exposing the material to light and/or heat).

However, during the casting and curing process, various factors can interfere with the shape of the resulting film, causing it to become distorted from its intended shape. As an example, a film can become distorted due to the build up of internal stresses within during the polymerization process. For instance, as a photocurable material is cured, monomers of the photocurable material polymerize into longer and heavier chains. Correspondingly, the photocurable material reduces in volume (e.g., experiences "shrinkage") as the polymer chains physically move together. This results in a build up to internal stresses inside of the photocurable material (e.g., stresses resulting from an impedance to polymer chain mobility), and a storage of strain energy within the photocurable material. When the cured film is extracted from the mold, the strain energy is released resulting in thinning of the film. The film can thin differently depending on the spatial distribution of the internal stresses. Thus, films may exhibit variations from film to film, depending on the particular spatial distribution of internal stresses that were introduced during the polymerization process. Accordingly, the consistency of a film can be improved by regulating the distribution of stress within the film during the casting process. Example systems and techniques for regulating stress in a film are described herein.

In an aspect a method of forming a waveguide film includes dispensing a photocurable material into a space between a first mold portion and a second mold portion opposite the first mold portion, adjusting a relative separation between a surface of the first mold portion with respect to a surface of the second mold portion opposing the surface of the first mold portion, and irradiating the photocurable material in the space with radiation suitable for photocuring the photocurable material to form a cured waveguide film. Further, the method includes, concurrent to irradiating the photocurable material, performing at least one of varying the relative separation between the surface of the first mold portion and the surface of the second mold portion, and varying an intensity of the radiation irradiating the photocurable material.

Implementations of this aspect can include one or more of the following features.

In some implementations, the relative separation can be varied to regulate a force experienced by the first mold portion along an axis extending between the first mold portion and the second mold portion. The relative separation can be varied based on a closed-loop control system that regulates the force.

In some implementations, the relative separation can be varied after irradiating the photocurable material for a time sufficient to reach a gel point in the photocurable material. The relative separation can be reduced after irradiating the photocurable material for the time sufficient to reach the gel point in the photocurable material In some implementations, varying the relative separation can include moving the first mold portion towards the second mold portion to compress one or more spacer structures disposed between the first mold portion and the second mold portion. The spacer structures can be compressed according to an open-loop control system.

In some implementations, varying the relative separation can include oscillating the position of the first mold portion relative to the second mold portion.

In some implementations, varying the intensity of the radiation can include varying a spatial intensity pattern irradiating the photocurable material.

In some implementations, varying the intensity of the radiation can include varying a power of the radiation. Varying the power can include pulsing the radiation. Each pulse of the radiation can have the same power. Pulses of the radiation can have different power. Each pulse of the radiation can have the same duration. Pulses of the radiation can have different durations. A pulse frequency can be constant. A pulse frequency can be varied.

In some implementations, varying the intensity of the radiation can include sequentially irradiating different areas of the space.

In some implementations, the thickness of the space filled with photocurable material can vary and the intensity of the radiation can be varied so that regions of high relative thickness receive a higher radiation dose compared to regions of low relative thickness.

In some implementations, the method can further include separating the cured waveguide film from the first mold portion and the second mold portion.

In another example, a method can include assembling a head mounted display comprising the waveguide film formed using one or more of the methods described herein.

The details of one or more embodiments are set forth in the accompanying drawings and the description below. Other features and advantages will be apparent from the description and drawings, and from the claims.

DESCRIPTION OF DRAWINGS

FIG. 6A is a diagram of an example system for regulating stresses within a photocurable material during curing.

FIG. 6B is a diagram of another example system for regulating stresses within a photocurable material during curing.

DETAILED DESCRIPTION

System and techniques for producing polymer film are described herein. One or more of the described implementations can be used to produce polymer film in a highly precise, controlled, and reproducible manner. The resulting polymer films can be used in a variety of variation-sensitive applications (e.g., as a part of eyepieces in an optical imaging system).

In some implementations, polymer films can be produced such that wrinkles, uneven thicknesses, or other unintended physical distortions are eliminated or otherwise reduced. This can be useful, for example, as the resulting polymer film exhibits more predictable physical and/or optical properties. For example, polymer films produced in this manner can diffract light in a more predictable and consistent manner, and thus, may be more suitable for use a high resolution optical imaging system. In some cases, optical imaging systems using these polymer films can produce sharper and/or higher resolution images than might otherwise be possible with other polymer films.

Figure 1:
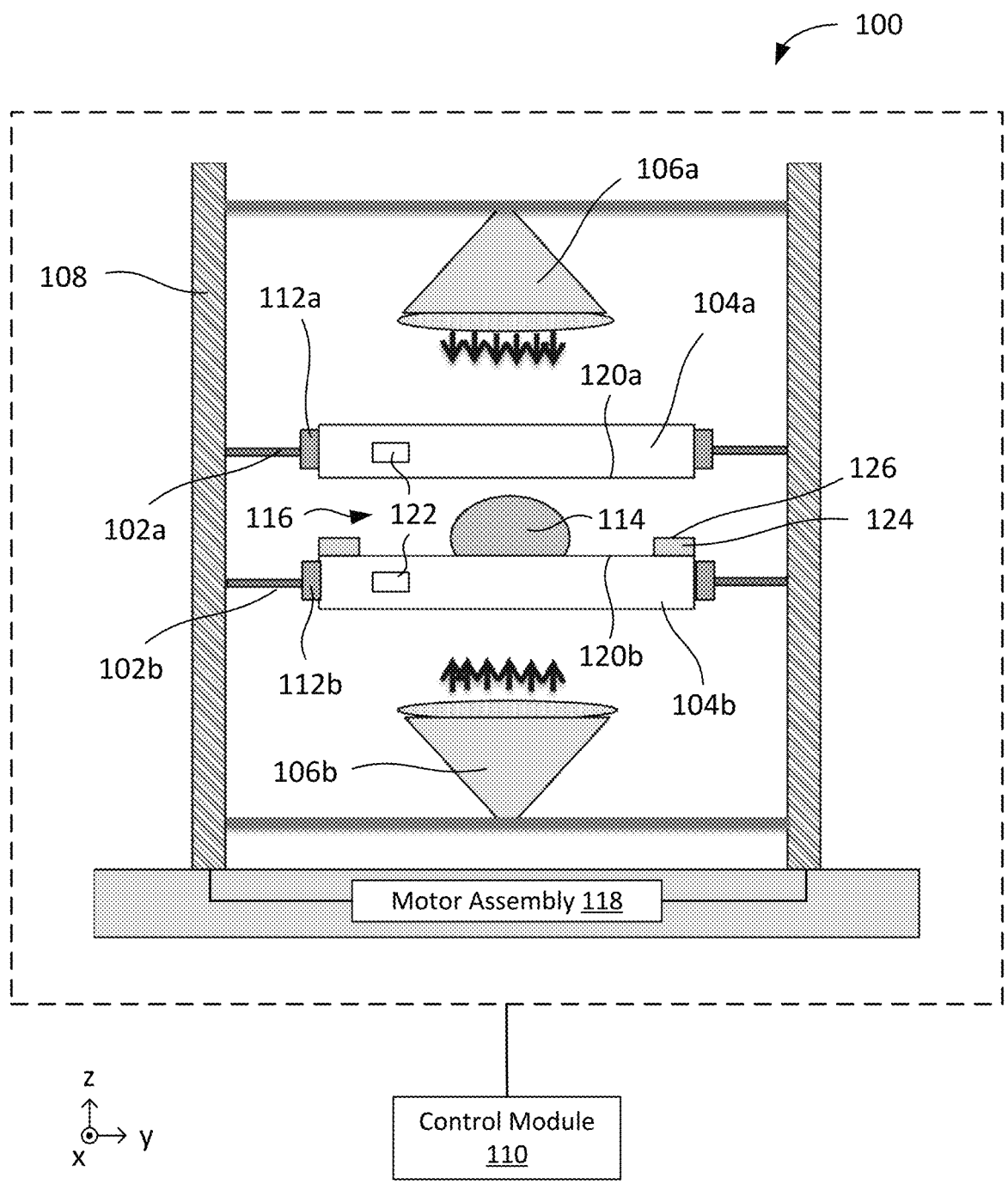
FIG. 1 is a diagram of an example system for producing polymer products.

An example system 100 for producing polymer film is shown in FIG. 1. The system 100 includes two actuable stages 102a and 102b, two mold structures 104a and 104b, two light sources 106a and 106b, a support frame 108, and a control module 110.

During operation of the system 100, the two mold structures 104a and 104b (also referred to as "optical flats") are secured to the actuable stages 102a and 102b, respectively (e.g., through clamps 112a and 112b). In some cases, the clamps 112a and 112b can be magnetic (e.g., electromagnets) and/or pneumatic clamps that enable the mold structures 104a and 104b to be reversibly mounted to and removed from the actuable stages 102a and 102b. In some cases, the clamps 112a and 112b can be controlled by a switch and/or by the control module 110 (e.g., by selectively applying electricity to the electromagnets of the clamps 112a and 112b and/or selectively actuating pneumatic mechanisms to engage or disengage the molds structures).

A photocurable material 114 (e.g., a photopolymer or light-activated resin that hardens when exposed to light) is deposited into the mold structure 104b. The mold structures 104a and 104b are moved into proximity with one another (e.g., by moving the actuable stages 102a and/or 102b vertically along the support frame 108), such that the photocurable material 114 is enclosed by the mold structures 104a and 104b. The photocurable material 114 is then cured (e.g., by exposing the photocurable material 114 to light from the light sources 106a and/or 106b), forming a thin film having one or more features defined by the mold structures 104a and 104b. After the photocurable material 114 has been cured, the mold structures 104a and 104b are moved away from each other (e.g., by moving the actuable stages 102a and/or 102b vertically along the support frame 108), and the film is extracted.

The actuable stages 102a and 102b are configured to support the mold structures 104a and 104b, respectively. Further, the actuable stages 102a and 102b are configured to manipulate the mold structures 104a and 104b, respectively, in one or more dimensions to control a gap volume 116 between the mold structures 104a and 104b.

For instance, in some cases, the actuable stage 102a can translate the mold structure 104a along one or more axes. As an example, the actuable stage 102a can translate the mold structure 104a along an x-axis, a y-axis, and/or a z-axis in a Cartesian coordinate system (i.e., a coordinate system having three orthogonally arranged axes). In some cases, the actuable stage 102a can rotate or tilt the mold structure 104a about one or more axes. As an example, the actuable stage 102a can rotate the mold structure 104a along an x-axis (e.g., to "roll" the mold structure 104a), a y-axis (e.g., to "pitch" the mold structure 104a), and/or a z-axis (e.g., to "yaw" the mold structure 104a) in a Cartesian coordinate system. Translation and/or rotation with respect to one or more other axes are also possible, either in addition to or instead of those described above. Similarly, the actuable stage 102b can also translate the mold structure 104b along one or more axes and/or rotate the mold structure 104b about one or more axes.

In some cases, the actuable stages 102a can manipulate the mold structure 104a according to one or more degrees of freedom (e.g., one, two, three, four, or more degrees of freedom). For instance, the actuable stage 102a can manipulate the mold structure 104a according to six degrees of freedom (e.g., translation along an x-axis, y-axis, and z-axis, and rotation about the x-axis, y-axis, and z-axis). Manipulation according to one or more other degrees of freedom is also possible, either in addition to or instead of those described above. Similarly, the actuable stage 102b can also manipulate the mold structure 104b according to one or more degrees of freedom In some cases, the actuable stages 102a and 102b can include one or more motor assemblies configured to manipulate the mold structures 104a and 104b and control the gap volume 116. For example, the actuable stages 102a and 102b can include a motor assembly 118 configured to manipulate the actuable stages 102a and 102b, thereby repositioning and/or reorienting the actuable stages 102a and 102b.

In the example shown in FIG. 1, the actuable 102a and 102b can both be moved relative to the support frame 108 to control the gap volume 116. In some cases, however, one of the actuable stages can be moved relative to the support frame 108, while the other can remain static with respect to the support frame 108. For example, in some cases, the actuable stage 102a can be configured to translate in one or more dimensions relative to the support frame 108 through the motor assembly 118, while the actuable stage 102b can be held static with respect to the support frame 108.

The mold structures 104a and 104b collectively define an enclosure for the photocurable material 114. For example, the mold structures 104a and 104b, when aligned together, can define a hollow mold region (e.g., the gap volume 116), within which the photocurable material 114 can be deposited and cured into a film. The mold structures 104a and 104b can also define one or more structures in the resulting film. For example, the mold structures 104a and 104b can include one or more protruding structures (e., gratings) from the surfaces 120a and/or 120b that impart a corresponding channel in the resulting film. As another example, the mold structures 104a and 104b can include one or more channels defined in the surfaces 120a and/or 120b that impart a corresponding protruding structure in the resulting film. In some cases, the mold structures 104a and 104b can impart a particular pattern on one or both sides of the resulting film. In some cases, the mold structures 104a and 104b need not impart any pattern of protrusions and/or channels on the resulting film at all. In some cases, the mold structures 104a and 104b can define a particular shape and pattern, such that the resulting film is suitable for use as an eyepiece in an optical imaging system (e.g., such that the film has one or more light diffractive microstructures or nanostructures that impart particular optical characteristics to the film).

In some cases, the surfaces of the mold structures 104a and 104b that face each other can each be substantially flat, such that the gap volume 116 defined between them exhibits a TTV of 500 nm or less. For example, the mold structure 104a can include a substantially flat surface 120a, and the mold structure 104b can have substantially flat surface 120b. A substantially flat surface can be, for example, a surface that deviates from a flatness of an ideal flat surface (e.g., a perfectly flat surface) by 100 nm or less (e.g., 100 nm or less, 75 nm or less, 50 nm or less, etc.). A substantially flat surface can also have a local roughness of 2 nm or less (e.g., 2 nm or less, 1.5 nm or less, 1 nm or less, etc.) and/or an edge-to-edge flatness of 500 nm or less (e.g., 500 nm or less, 400 nm or less, 300 nm or less, 50 nm or less, etc.). In some cases, one or both of the surfaces of the mold structures 104a and 104b can be polished (e.g., to further increase the flatness of the surfaces). A substantially flat surface can be beneficial, for example, as it enables the mold structures 104a and 104b to define a gap volume 116 that is substantially consistent in thickness along the extent of the mold structures 104a and 104b (e.g., having a TTV of 500 nm or less). Thus, the resulting optical films can be flat (e.g., having a total thickness variation [TTV] and/or a local thickness variation [LTV] less than or equal to a particular threshold value, for example less than 500 nm, less than 400 nm, less than 300 nm, etc.). Further, polished mold structures 104a and 104b can be beneficial, for example, in providing smoother optical films for optical imaging applications. As an example, eyepieces constructed from smoother optical films may exhibit improved imaging contrast.

Figure 16:
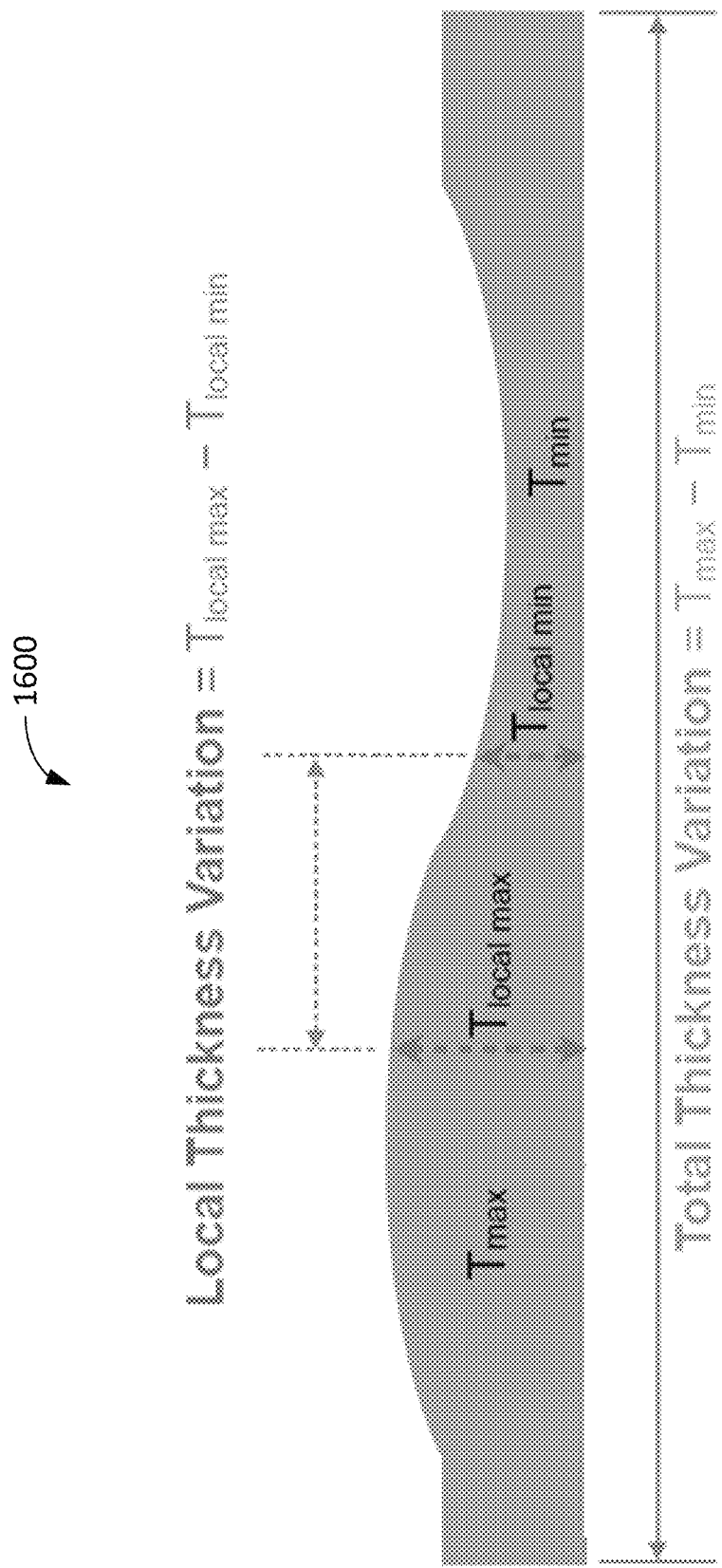
FIG. 16 is a diagram of a cross-section of an example optical film.

The TTV and LTV of an example optical film 1600 are shown in FIG. 16. The TTV of the optical film 1600 refers to the maximum thickness of the optical film 1000 with respect to the entirety of the optical film 1600 ($T_{max}$), minus the minimum thickness of the optical film 1600 with respect to the entirety of the optical film 1600 ($T_{min}$) (e.g., TTV=$T_{max}$-$T_{min}$). The LTV of the optical film 1600 refers to the maximum thickness of the optical film 1600 with respect to a localized portion of the optical film 1600 ($T_{local\ max}$), minus the minimum thickness of optical film 1600 with respect to the localized portion of the optical film 1600 ($T_{local\ min}$) (e.g., LTV=$T_{local\ max}$-$T_{local\ min}$). The size of the localized portion can differ, depending on the application. For example, in some cases, the localized portion can be defined as a portion of the optical film having a particular surface area. For instance, for optical films intended for used as eyepieces in an optical imaging system, the surface area of the localized portion can be an area having a 2.5-inch diameter. In some cases, the surface area of the localized portion can differ, depending on the eyepiece design. In some cases, the surface area of the localized portion can differ, depending on the dimensions and/or features of the optical film.

The mold structures 104a and 104b are also rigid, such that they do not flex or bend during the film production process. The rigidity of the mold structures 104a and 104b can be expressed in terms of its bending stiffness, which is a function of the elastic modulus of the mold structures (E) and the second moment of area of the mold structures (I). In some cases, the mold structures each can have a bending stiffness of 1.5 Nm² or greater.

Further still, the mold structures 104a and 104b can be partially or fully transparent to radiation at one or more wavelengths suitable for photocuring the photocurable material (e.g., between 315 nm and 430 nm). Further still, the mold structures 104a and 104b can the made from a material that is thermally stable (e.g., does not change in size or shape) up to a particular threshold temperature (e.g., up to at least 200° C.). For example, the mold structures 104a and 104b can be made of glass, silicon, quartz, Teflon, and/or poly-dimethyl-siloxane (PDMS), among other materials.

In some cases, the mold structures 104a and 104b can have a thickness greater than a particular threshold value (e.g., thicker than 1 mm, thicker than 2 mm, etc.). This can be beneficial, for example, as a sufficiently thick mold structure is more difficult to bend. Thus, the resulting film is less likely to exhibit irregularities in thickness. In some cases, the thickness of the mold structures 104a and 104b can be within a particular range. For example, each of the mold structures 104a and 104b can be between 1 mm and 50 mm thick. The upper limit of the range could correspond, for example, to limitations of an etching tool used to pattern the mold structures 104a and 104b. In practice, other ranges are also possible, depending on the implementation.

Similarly, in some cases, the mold structures 104a and 104b can have a diameter greater than a particular threshold value (e.g., greater than 3 inches). This can be beneficial, for example, as it enables relatively larger films and/or multiple individual films to be produced simultaneously. Further, if unintended particulate matter is entrapped between the mold structures (e.g., between a spacer structure 124 and an opposing mold structure 104a or 104b, such as at a position 126), its effect on the flatness of the resulting filming film is lessened.

For instance, for mold structures 104a and 104b having a relatively small diameter, a misalignment on one side of the mold structures 104a and 104b (e.g., due to entrapped particulate matter on one of the spacer structures 124, such as at the position 126) may result in a relatively sharper change in thickness in the gap volume 116 along the extent to the mold structures 104a and 104b. Thus, the resulting film or films exhibit more sudden changes in thickness (e.g., a steeper slope in thickness along the length of the film).

However, for mold structures 104a and 104b having a comparatively larger diameter, a misalignment on one side of the mold structures 104a and 104b will result in a more gradual change in thickness in the gap volume 116 along the extent to the mold structures 104a and 104b. Thus, the resulting film or films exhibit less sudden changes in thickness (e.g., a comparatively more gradual slope in thickness along the length of the film). Accordingly, mold structures 104a and 104b having a sufficiently large diameter are more "forgiving" with respect to entrapped particulate matter, and thus can be used to produce more consistent and/or flatter films.

As an example, if a particle of 5 μm or less is entrapped along a point at the periphery of the mold structures 104a and 104b (e.g., at the position 126), and the mold structures 104a and 104b each have a diameter of 8 inches, a gap volume having a horizontal surface area of 2 square inches within the extent of the mold structures 104a and 104b will still have a TTV of 500 nm or less. Thus, if a photocurable material is deposited within the gap volume, the resulting film will similarly exhibit a TTV of 500 nm or less.

The light sources 106a and 106b are configured to generate radiation at one or more wavelengths suitable for photocuring the photocurable material 114. The one or more wavelengths can differ, depending on the type of photocurable material used. For example, in some cases, a photocurable material (e.g., an ultraviolet light-curable liquid silicone elastomer such as Poly(methyl methacrylate) or Poly(dimethylsiloxane)) can be used, and correspondingly the light source can be configured to generate radiation having a wavelength in a range from 315 nm to 430 nm to photocure the photocurable material. In some cases, one or more of the mold structures 104a and 104b can be transparent, or substantially transparent to radiation at the suitable for photocuring the photocurable material 114, such that radiation from the light sources 106a and/or 106b can pass through the mold structures 104a and/or 104b and impinge upon the photocurable material 114.

The control module 110 is communicatively coupled to the actuable stages 102a and 102b, and is configured to control the gap volume 116. For instance, the control module 110 can receive measurements regarding gap volume 116 (e.g., the distance between the mold structures 104a and 104b at one or more locations) from the sensor assembly 122 (e.g., a device having one or more capacitive and/or pressure-sensitive sensor elements) and reposition and/or reorient one or both of the mold structures 104a and 104b in response (e.g., by transmitting commands to the actuable stages 102a and 102b).

As an example as shown in FIG. 1, the system 100 can include one or more spacer structures 124 (e.g., protrusions or gaskets) that project from one or more surfaces of the mold structure (e.g., mold structure 104b) and towards an opposing mold structure (e.g., mold structure 104a). The spacer structures 124 can each have a substantially equal vertical height, such that when the mold structures 104a and 104b are brought together (e.g., pressed together), the spacer structures 124 abut the mold structures 104a and 104b and a substantially flat gap volume 116 is defined between them.

Further, spacer structures 124 can be positioned in proximity to and at least partially enclosing the area of the mold structures 104a and 104b for receiving and curing the photocurable material 114. This can be beneficial, for example, as it enables the system 100 to produce polymer films having a low TTV and/or LTV, without necessarily requiring that a low TTV and/or LTV be maintained across the entirety of the extend of the mold structures 104a and 104b. For example, multiple different polymer films can be produced without the need of achieving low TTV over the entire volume between the mold structures 104a and 104b. Accordingly, the throughput of the production process can be increased.

Figure 2:
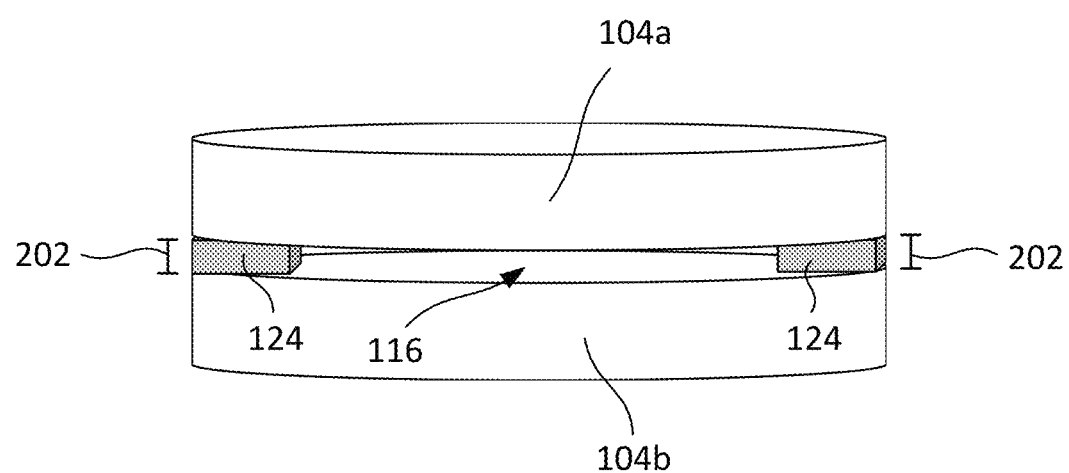
FIG. 2 is a diagram of example mold structures with spacing structures.

For example, FIG. 2 shows an example mold structures 104a and 104b with spacer structures 124 disposed between them. When the mold structures 104a and 104b are brought together, the spacer structures 124 abut the mold structures 104a and 104b and physically obstruct the mold structures 104a and 104b from getting any nearer to each other than the vertical height 202 of the spacer structures 124. As the vertical height 202 of each of the spacer structures 124 is substantially equal, a substantially flat gap volume 116 is defined between the mold structures 104a and 104b. In some cases, the vertical height 202 of the spacer structures 124 can be substantially equal to the desired thickness of the resulting film.

The spacer structures 124 can be constructed from various materials. In some cases, the spacer structures 124 can be constructed from a material that is thermally stable (e.g., does not change in size or shape) up to a particular threshold temperature (e.g., up to at least 200° C.). For example, the spacer structures 124 can be made of glass, silicon, quartz, and/or Teflon, among other materials. In some cases, the spacer structures 124 can be constructed from the same material as the mold structures 104a and/or 104b. In some cases, the spacer structures 124 can be constructed from a different material as the mold structures 104a and/or 104b. In some cases, one or more of the spacer structures 124 can be integrally formed with the mold structures 104a and/or 104b (e.g., etched from the mold structures 104a and/or 104b, imprinted onto the mold structures 104a and/or 104b through a lithographic manufacturing processes, or additively formed onto the mold structures 104a and/or 104b such as through an additive manufacturing processes). In some cases, one or more of the spacer structures 124 can be discrete from the mold structures 104a and/or 104b, and can be secured or affixed to the mold structures 104a and/or 104b (e.g., using glue or other adhesive).

Although two spacer structures 124 are shown in FIG. 2, this is merely an illustrative example. In practice, there can be any number of spacer structures 124 (e.g., one, two, three, four, or more) protruding from the mold structure 104a, the mold structure 104b, or both. Further still, although FIG. 2 shows the spacer structures 124 positioned along a periphery of the mold structures 104a and 104b, in practice, each spacer structures 124 can be positioned anywhere along the extent of the mold structures 104a and 104b.

During the casting and curing process, various factors can interfere with the shape of the resulting film, causing it to become distorted from its intended shape. As an example, a film can become distorted due to the build up of internal stresses within during the polymerization process. For instance, as a photocurable material is cured, monomers of the photocurable material polymerize into longer and heavier chains. Correspondingly, the photocurable material reduces in volume (e.g., experiences "shrinkage") as the polymer chains physically move together. This results in a build up to internal stresses inside of the photocurable material (e.g., stresses resulting from an impedance to polymer chain mobility), and a storage of strain energy within the photocurable material. When the cured film is extracted from the mold, the strain energy is released resulting in thinning of the film. The film can thin differently depending on the spatial distribution of the internal stresses. Thus, films may exhibit variations from film to film, depending on the particular spatial distribution of internal stresses that were introduced during the polymerization process. Accordingly, the consistency of a film can be improved by regulating the distribution of stress within the film during the casting process.

Figure 3:
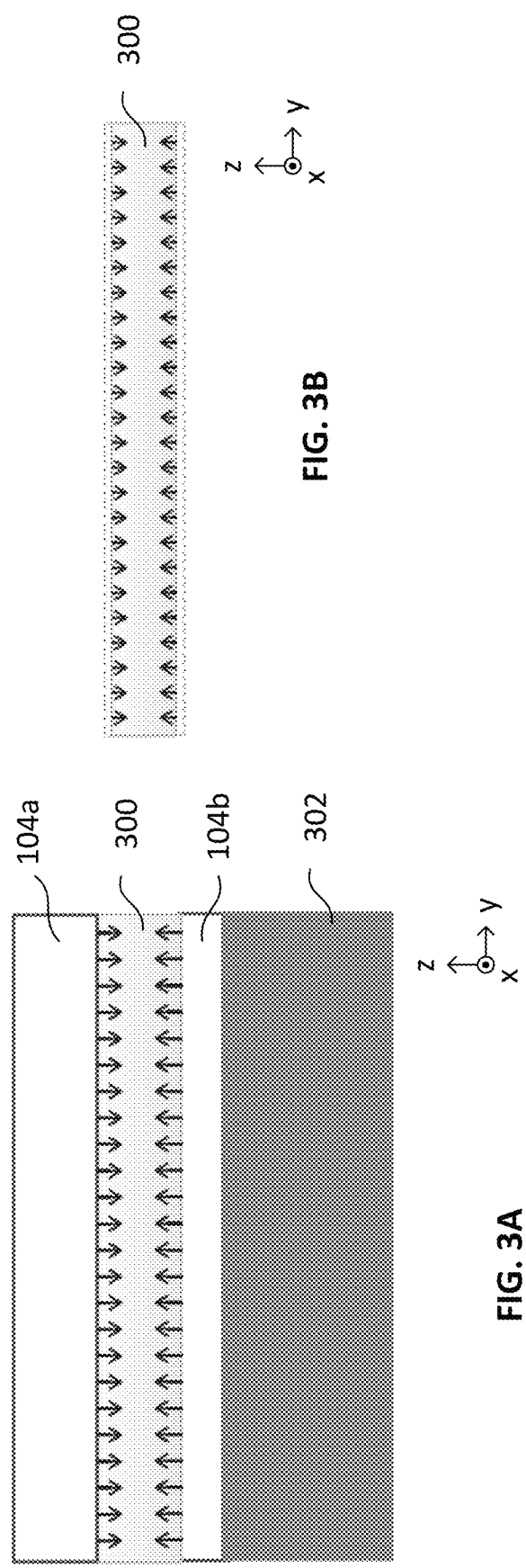
FIG. 3A is a diagram of an example polymer film during the casting and curing process.
FIG. 3B is a diagram of an example polymer film after curing and extraction.

To illustrate, FIG. 3A shows an example polymer film 300 during the casting and curing process (e.g., when the polymer film 300 is positioned between mold structures 104a and 104b), and FIG. 3B shows the polymer film 300 after curing and extraction (e.g., after the polymer film 300 has been "demolded"). As shown in FIG. 3A, as the polymer film 300 is cured, it shrinks in size (indicated by the vertical arrows). This can result in a delamination of the polymer film 300 from the mold structures 104a and/or 104b (e.g., if the stress is greater than the adhesion or bond force between the polymer film and the mold structure). Further, this can cause the mold structure 104b to become separated from the vacuum chuck 302 holding the mold structure 104b in place (e.g., if the stress is greater than the vacuum strength of the vacuum chuck 302). Further still, this can cause a fracturing the in the mold structures 104a and 104b (e.g., if the stress is greater than the strength of the mold structures). Further still, this shrinkage can result in the storage of strain energy within the polymer film 300. As shown in FIG. 3B, after the polymer film 300 is extracted from the mold structures 104a and 104b, it experiences structural relaxation and further shrinking (indicated by the vertical arrows), resulting in a thinning of the polymer film 300.

The polymer film can thin differently depending on the spatial distribution of the internal stresses, resulting in localized variations in thickness. In some cases, the thickness variation distribution is correlated to the intensity distribution of the light used to photocure the photocurable material.

Figure 4:
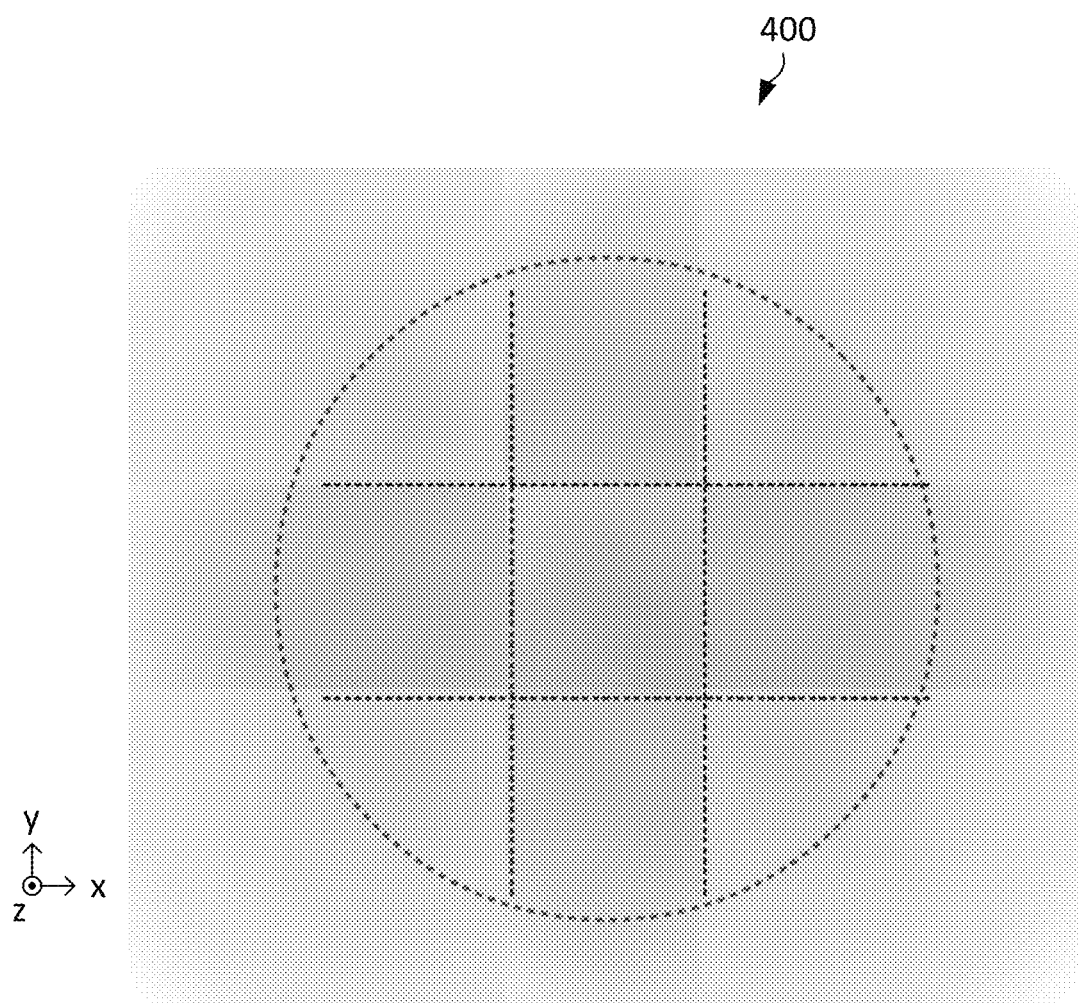
FIG. 4 is a diagram of an example distribution of light for curing a photocurable material.
Figure 5B:
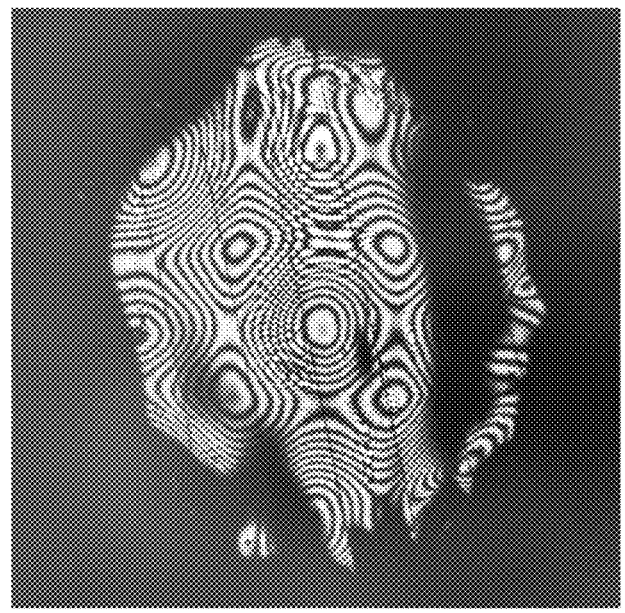
FIGS. 5A and 5B are images of example polymer films.
Figure 5A:
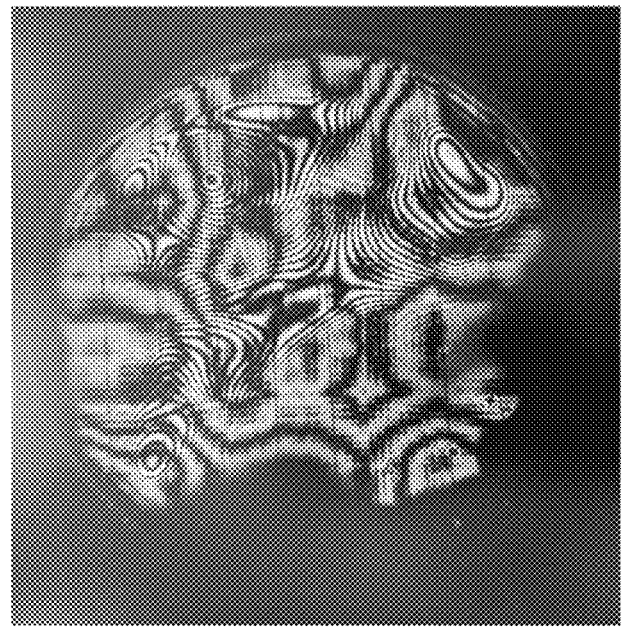

As an example, FIG. 4 shows an example intensity distribution of light 400 used to photocure the photocurable material (e.g., light generated using a 2×2 array of ultraviolet (UV) light sources with overlapping areas). Portions of the distribution having a higher intensity of light are shown in darker shades, while portions having a lower intensity of light are shown in lighter shades. FIGS. 5A and 5B show two example polymer films 500a and 500b that were cured using the light having the intensity distribution 400. As shown in FIGS. 5A and 5B, each of the polymer films 500a and 500b exhibits wrinkling and marked thickness variation, particularly at its fringes.

Various techniques can be used to regulate the internal stresses within a polymer film before, during, and/or after the curing process.

In some cases, the mold structures 104a and 104b can be adjusted during the curing process to compensate for shrinkage in the photocurable material. An example, FIG. 6A shows photocurable material 114 positioned between the mold structures 104a and 104b. In this example, the mold structure 104b is fixed in position (e.g., secured to a vacuum chuck 302), while the mold structure 104a is configured to move up and down (e.g., moved away from the mold structure 104a, and towards the mold structure 104b using an actuable stage). Further, the mold structures 104a and 104b are positioned such that they apply a particular amount of force onto the photocurable material 114.

During the curing process, light is directed towards the photocurable material 114. As the photocurable material 114 cures and shrinks in size (e.g., reduces in thickness), the mold structure 104a is moved towards the mold structure 104b to compensate for the change in size and to maintain the same amount of force on the photocurable material 114. This reduces or otherwise eliminates the build up of internal stresses within the photocurable material, and reduces the potential thickness variations in the photocurable material 114 after it is cured and extracted from the mold.

In some cases, the mold structures 104a and 104b can apply a compression force to the photocurable material 114 while the photocurable material 114 is still in a "reflowable" liquid phase (e.g., before the photocurable material 114 been cured to its gel point). In some cases, the mold structures 104a and 104b can apply a compression force to the photocurable material 114 while photocurable material 114 is in a compressible gel phase (e.g., after the photocurable material 114 has been cured to its gel point, but before it has reached its solid point).

In some cases, the mold structures 104a and 104b can be operated according to a closed loop control system. For example, as shown in FIG. 6A, the mold structures 104a and 104b can include one or more sensor assemblies 122 including force sensors, each configured to measure an applied force at a particular location along a particular mold structure 104a or 104b. The sensor assemblies 122 can be communicatively coupled to the control module 110 (e.g., as shown and described with respect to FIG. 1), and can be configured to transmit force measurements to the control module 110 during operation of the system. Based on the force measurements, the control module 110 can control the position of the mold structure 104a relative to the mold structure 104b (e.g., using the actuable stage 102a) to maintain a constant force on the photocurable material 114 during the curing process, while maintaining parallelism between the mold structure 104a and the mold structure 104b. The final thickness of the resulting polymer film and the stress level stored in the polymer film can be controlled by regulating the applied force on the photocurable material 114. In some cases, forces in the range of 5 N to 100 N can be applied to the photocurable material 114. In some cases, applying a higher force enables the final thickness of the polymer film to be closer to the width of the initial gap between the mold structures 104a and 104b, but with less regulation of stress within the polymer film.

In some cases, the mold structures 104a and 104b can be operated according to an open loop control system. For example, as shown in FIG. 6B, the mold structures 104a and 104b can include one or more compressible spacer structures 602, and one or more incompressible spacer structures 604. The incompressible spacer structures 604 define the minimum distance between the mold structures 104a and 104b. The compressible spacer structures 602 have a greater height than the incompressible spacer structures 604, and are less stiff than the incompressible spacer structures 604 (e.g., such that they can be compressed by the application of a certain amount of force). During operation of the system, the control module 110 moves the mold structure 104a towards the mold structure 104b to compress the compressible spacer structures 604, and corresponding to apply a predetermined constant force to the photocurable material 114). The control module 110 continues to move the mold structure 104a towards the mold structure 104b until they are abutted by the incompressible spacer structures 604.

Each of the compressible spacer structures 604 can have the same height and the same stiffness, such that the mold structures 104a and 104b apply an even force onto the photocurable material 114 while maintaining parallelism between the mold structure 104a and the mold structure 104b. The final thickness of the resulting polymer film and the stress level stored in the polymer film can be controlled by specifying particular heights and stiffnesses for the compressible spacer structures 604. In some cases, the height of a compressible spacer structure 604 can be between 5% to 15% greater than the height of the compressive spacer structures 604 (e.g., corresponding to the volume shrinkage of the photocurable material 114 during the curing process). In some cases, the stiffness of the compressible spacer structures can be between 0.01 GPa and 0.1 GPa (e.g., similar to rubber). In some cases, the compressible spacer structures 604 can be constructed of rubber, polyethylene, Teflon, polystyrene foam, and/or other compressible material.

In some cases, the system can also include one or more spring mechanisms 606 positioned between the mold structures 104a and 104b. These spring mechanisms 606 can further regulate the amount of force that is applied to the photocurable material 114, and to further maintain the parallelism between the mold structure 104a and the mold structure 104b In some cases, the mold structures 104a and 104b can be cyclically moves towards each other and away from each other to apply a cyclic load on the photocurable material 114 during the curing process. This can be useful, for example, as compressing and stretching during the photocurable material 114 during the curing process can relax the stresses build into the photocurable material.

Figure 7:
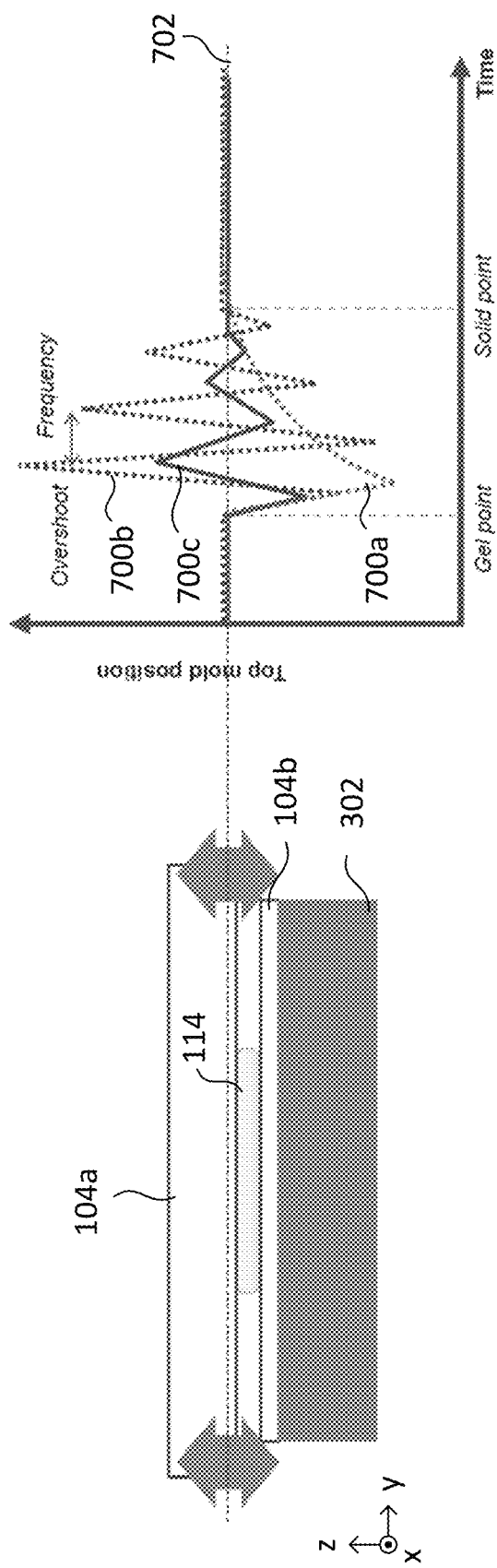
FIG. 7 is a diagram of another example system for regulating stresses within a photocurable material during curing.

As an example, as shown in FIG. 7, the mold structure 104a can be moved according to one or more movement patterns 700a-c. As an example, in the movement pattern 700a, the mold structure 104a is moved according to a low response time and low gain (e.g., the mold structure 104a is moved towards the mold structure 104b after the photocurable material 114 has been cured to its gel point, and gradually moved away). As another example, in the movement pattern 700b, the mold structure 104a is moved according to a high response time and high gain (e.g., the mold structure 104a is alternatively moved away from the mold structure 104b and towards the mold structure in according to an "overshoot" decaying oscillatory pattern after the photocurable material 114 has been cured to its gel point). As another example, the in the movement pattern 700c, the mold structure 104a is moved according to a medium response time and medium gain (e.g., the mold structure 104a is alternatively moved away from the mold structure 104b and towards the mold structure according to a "tuned" decaying oscillatory pattern after the photocurable material 114 has been cured to its gel point). Although three example patterns are shown in FIG. 7, other patterns are also possible, depending on the implementation.

In practice, the mold structures 104a and 104b can be controlled such that the spacing between them oscillates or "bounces" a particular number of times, and does so according to a particular frequency. As an example, the spacing between the mold structures 104a and 104b can oscillate one or more times (e.g., one, two, three, or more times) between the gel point and the solid point. In some cases, the length of time between a gel point and the solid point can be approximately three seconds. This can correspond to oscillations of 0.33 Hz, 0.67 Hz, 1 Hz, or more. Further, the amplitude of the oscillations can also vary. In some cases, the each oscillation can be between approximately 5 to 10 μm upward or downward relative to a central reference position 702

In some cases, built in stresses can be removed from a polymer film by annealing the polymer film before it is extracted from the mold (e.g., before "demolding" the polymer film). Various techniques can be used to apply heat to a polymer film while it is still between the mold structures. As examples, a polymer film can be heated through conduction heating and/or and radiation heating, such as using one or more heated chucks, high intensity lamps, infrared (IR) lamps, and/or microwaves. In some cases, radiation heating may be preferable (e.g., for faster process time and potentially selective heating of the polymer film only). In some cases, the polymer film can be annealed by heating it to 40° C. to 200° C. for a period of 10 seconds to 3 minutes.

In some cases, the photocurable material 114 can be cured using patterns of light having a particular spatial distribution and/or particular temporal characteristics to reduce built in stresses from the resulting polymer film. Example lighting patterns 800a-c are shown in FIGS. 8A-8C.

Figure 8:
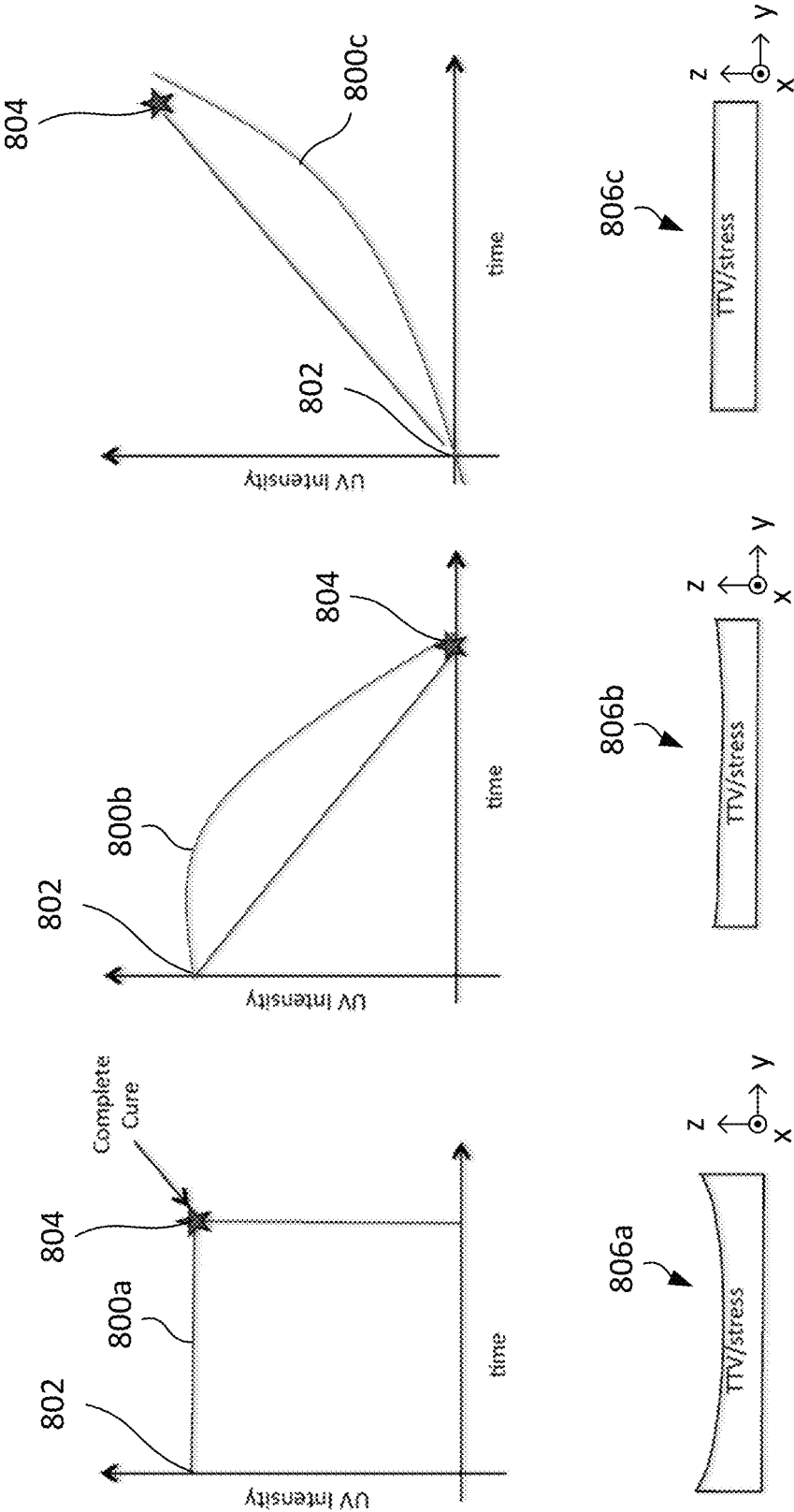
FIGS. 8A-8C are diagrams of example lighting patterns for curing photocurable material.

As shown in FIG. 8A, photocurable material can be cured by irradiating the photocurable material with a lighting pattern 800a having a continuous and uniform intensity over a period of time (e.g., from the beginning of the curing process 802 until the end of the curing process 804 when the photocurable material is fully cured). In some cases, use of the light pattern 800a can result in a polymer product 806a having a significant amount of built up stress (e.g., the non-stop exposure can impair the ability of the polymer material to respond quickly to movements by the polymer chains during shrinkage). In some cases, this can result in a polymer product 806a that is thicker along its periphery than along its central region (e.g., when viewed along a cross-section along the y-z plane).

As shown in FIG. 8B, photocurable material can be cured by irradiating the photocurable material with a lighting pattern 800b having a variable intensity over time. Initially (e.g., at the beginning of the curing process 802), the photocurable material is irradiated by high intensity light. As the curing process progresses, the photocurable material is irradiated by lower and lower intensity light until the photocurable material is fully cured (e.g., until the end of the curing process 804). In some cases, use of the light pattern 800b can result in photocurable material absorbing a relatively large amount of light in the initial stages of the curing process, resulting in creation of enough free radicals to drive the polymerization reactions. As the intensity of the light decreases, the polymer chains can re-arrange slowly, resulting in relatively lower amounts of stress in the cross-linked network (e.g., compared to the use of the lighting pattern 800a). In some cases, this can result in a polymer product 806b better mechanical properties (e.g., higher Young's modulus and/or hardness) and more consistent spatial dimensions (e.g., lower TTV) compared to use of the lighting pattern 800a.

As shown in FIG. 8C, photocurable material can be cured by irradiating the photocurable material with another lighting pattern 800c having a variable intensity over time. Initially (e.g., at the beginning of the curing process 802), the photocurable material is irradiated by lower intensity light. As the curing process progresses, the photocurable material is irradiated by higher and higher intensity light until the photocurable material is fully cured (e.g., until the end of the curing process 804). In some cases, use of the light pattern 800c can result in photocurable material absorbing a relatively lower amount of light in the initial stages of the curing process, resulting in lower rates of reactions during the early stages of the curing process. Thus, the monomers of the photocurable material react more slowly, resulting in relatively lower stress built up in the network. Subsequently, higher intensity light can be used to cure the photocurable material fully. In some cases, this can result in more consistent spatial dimensions (e.g., lower TTV) compared to use of the lighting pattern 800a. However, the mechanical properties may be less desirable in some contexts (e.g., compared to use of the lighting pattern 800b) due to a relatively slow rate of polymerization.

Although example lighting patterns 800a-c are shown and described above, these are merely illustrative examples. In practice, other lighting patterns can also be used to cure photocurable material, either instead of in in additional to those described herein.

In some cases, photocurable material can be cured by irradiating the photocurable material with one or more pulses of light over a period of time (e.g., exposing the photocurable material to light according to one or more on and off cycles). In some cases, the duration of each pulse of radiation (e.g., the duration of each "on" state) can vary relative to the duration of each period of time between pulses (e.g., the duration of each "off" state). Example lighting patterns 900a-c are shown in FIG. 9.

Figure 9:
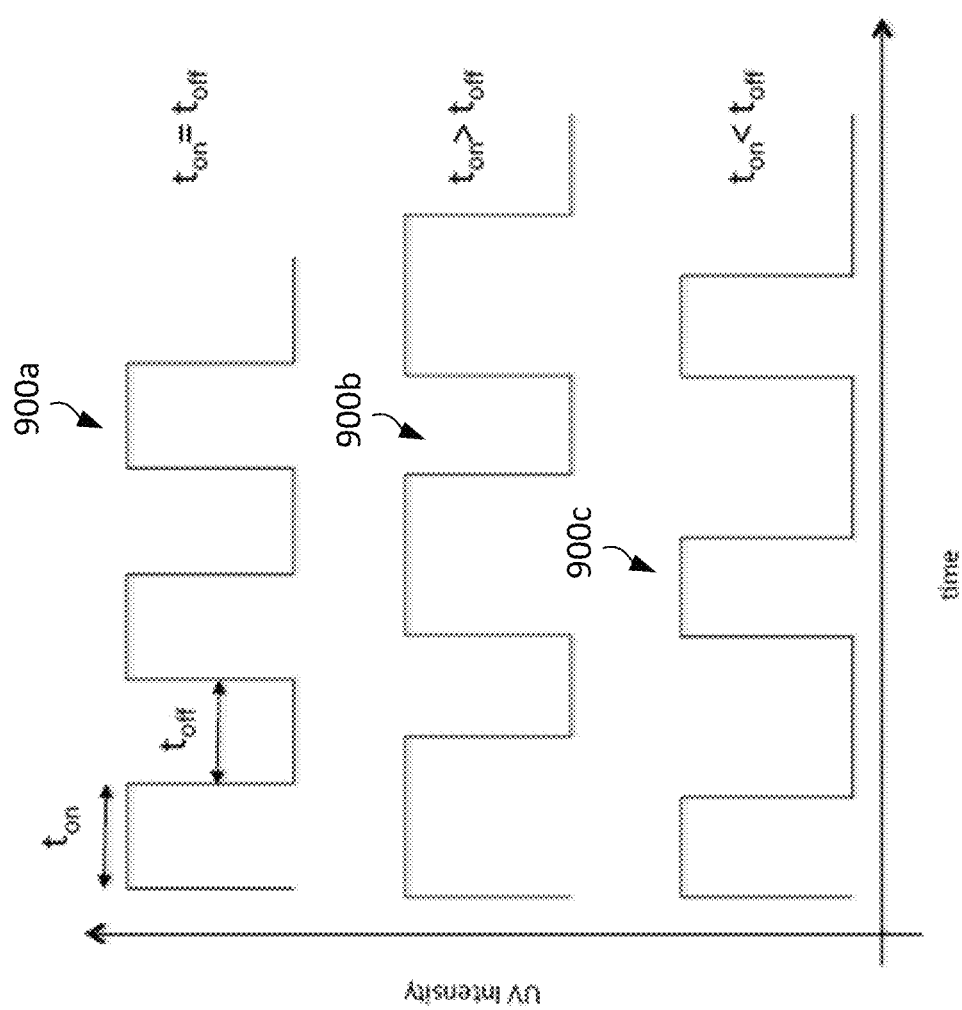
FIG. 9 is a diagram of additional example lighting patterns for curing photocurable material.

As shown in FIG. 9, photocurable material can be cured by irradiating the photocurable material with a lighting pattern 900a having multiple pulses over a period of time. In this example, the duration of each pulse $t_{on}$ (e.g., duration of each "on" state) is equal to the duration between pulses $t_{off}$ (e.g., the duration of each "off" state), corresponding to a 50% duty cycle of light. The light pattern 900a can be used to cure a photocurable material having a moderate rate of polymerization (e.g., during the "on" stages), while allowing the photocurable material to cool during the curing process (e.g., during the "off" stages). This can be beneficial, for example, in controlling the amount of heat and/or stress in the photocurable material. Further, the physical properties of the resulting polymer product (e.g., TTV patterns of the polymer product) can be realized by selecting a particular time interval for $t_{on}$ and $t_{off}$. In some cases, $t_{off}$ and $t_{on}$ can be between 0.05 s and 5 s.

As shown in FIG. 9, photocurable material also can be cured by irradiating the photocurable material with another lighting pattern 900b having multiple pulses over a period of time. In this example, the duration of each pulse $t_{on}$ (e.g., duration of each "on" state) is greater than the duration between pulses $t_{off}$ (e.g., the duration of each "off" state), corresponding to a greater than 50% duty cycle of light. The light pattern 900b can be used to cure a photocurable material having a slower rate of polymerization (e.g., by applying more light during the "on" stages compared to the lighting pattern 900a to drive polymerization), while also allowing the photocurable material to cool during the curing process (e.g., during the "off" stages). As above, this can be beneficial in controlling the amount of heat and/or stress in the photocurable material. Further, the physical properties of the resulting polymer product (e.g., TTV patterns of the polymer product) can be realized by selecting a particular time interval for $t_{on}$ and $t_{off}$. In some cases, $t_{off}$ can be between 0.05 s and 5 s, and $t_{on}$ can be between 0.05 s and 5 s.

As shown in FIG. 9, photocurable material also can be cured by irradiating the photocurable material with another lighting pattern 900c having multiple pulses over a period of time. In this example, the duration of each pulse $t_{on}$ (e.g., duration of each "on" state) is less than the duration between pulses $t_{off}$ (e.g., the duration of each "off" state), corresponding to a less than 50% duty cycle of light. The light pattern 900c can be used to cure a photocurable material having a faster rate of polymerization (e.g., by applying less light during the "on" stages compared to the lighting pattern 900a to drive polymerization), while also allowing the photocurable material to cool during the curing process (e.g., during the "off" stages). As above, this can be beneficial in controlling the amount of heat and/or stress in the photocurable material. Further, the physical properties of the resulting polymer product (e.g., TTV patterns of the polymer product) can be realized by selecting a particular time interval for $t_{on}$ and $t_{off}$. In some cases, $t_{off}$ can be between 0.05 s and 5 s, and $t_{on}$ can be between 0.05 s and 5 s.

Figure 10:
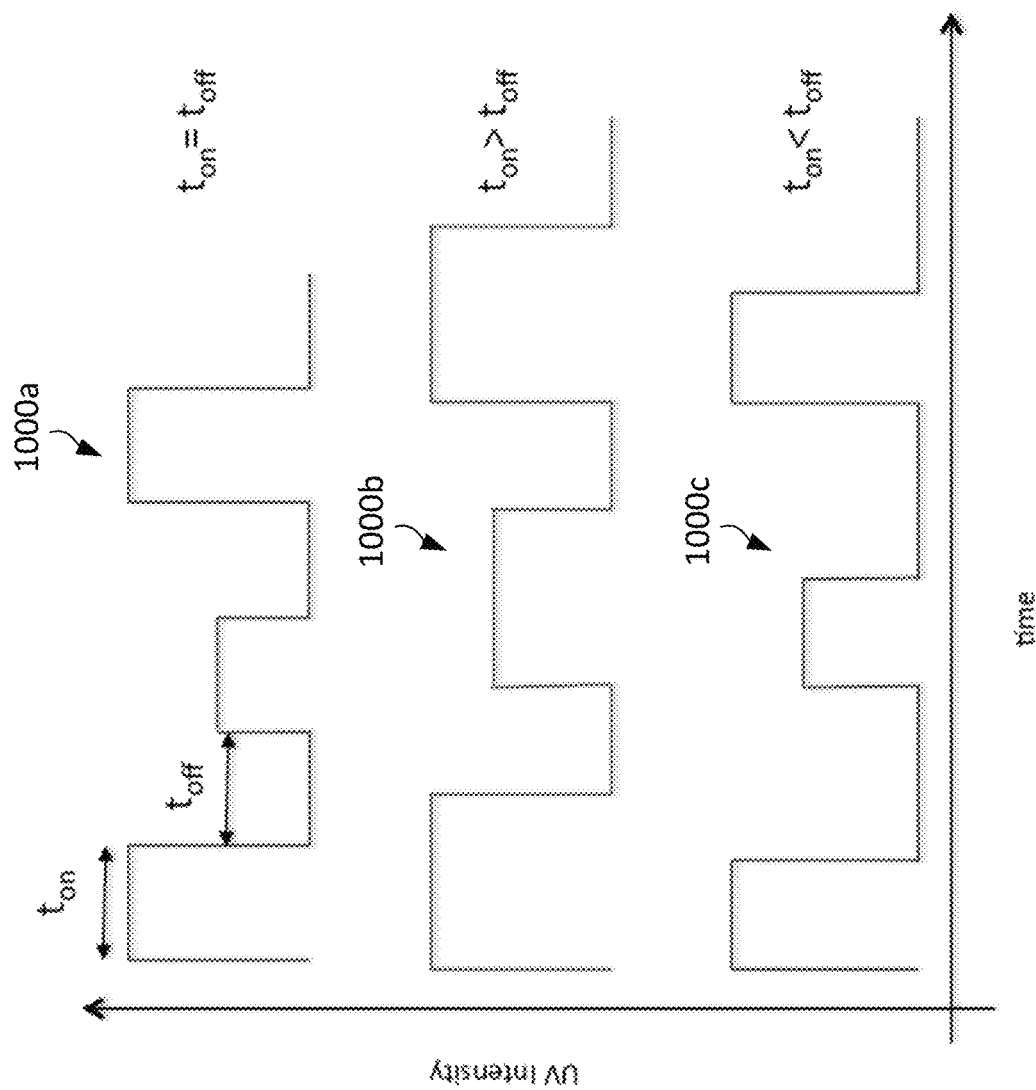
FIG. 10 is a diagram of additional example lighting patterns for curing photocurable material.

In some cases, the intensity of one or more pulses of radiation can have a different intensity from or more other pulses of radiation. Example lighting patterns 1000a-c are shown in FIG. 10. In each of these examples, the pulses of radiation alternate between pulses having a higher intensity and pulses having a lower intensity. This can be useful, for example, as some photocurable materials have lower thermal conductivity, and the heat generated by UV light and/or exothermic processes will take longer time to dissipate by conduction. Alternating high and low intensity pulses can help maintain the curing reaction at smoother rate. Although the patterns 1000*a-c* shown in FIG. 10 alternate between pulses having two different intensities, these are merely illustrative examples. In some cases, patterns can alternative between pulses having three or more different intensities (e.g., three, four, five, or more). Further, in some cases, patterns do not alternate between pulses having different intensities according to a regular or repeating pattern. For example, patterns can include pulses having any combination of intensities and arranged in any order.

In practice, the frequency of pulses can different, depending on the implementation. As an example, the frequency of pulses can be between 0.1 Hz and 20 Hz. In some cases, the frequency of pulses can be constant. In some cases, the frequency of pulses can vary over time.

In some cases, photocurable material can be cured by irradiating the photocurable material with light that varies in intensity with respect to space. For example, certain portions of the photocurable material can be irradiated with higher intensity light, while other portions of the photocurable material can be irradiated with lower intensity light. This can be useful, for example, in controlling the rate of polymerization photocurable material in localized areas to regulate the built up of heat and/or stress.

Figure 11B:
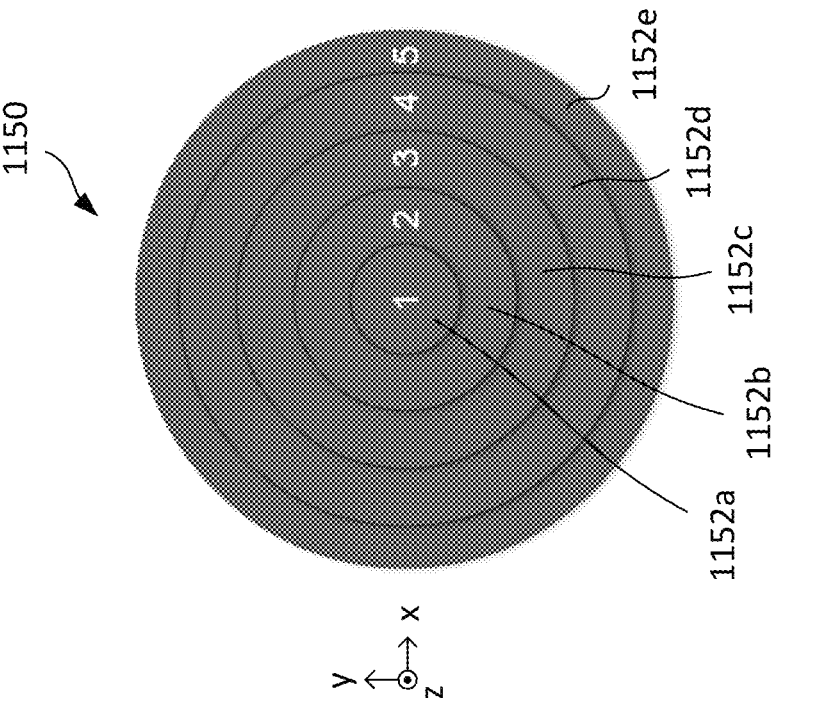
FIG. 11B is a diagram of additional example lighting pattern for curing photocurable material.
Figure 11A:
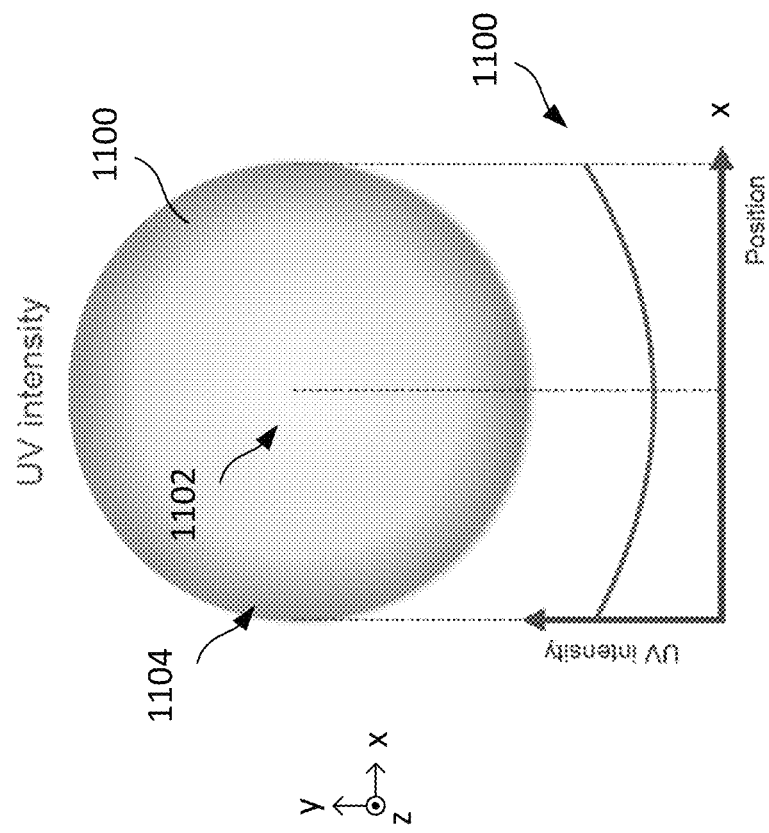
FIG. 11A is a diagram of an additional example lighting pattern for curing photocurable material.

As an example, FIG. 11A shows a lighting pattern 1100 that varies with respect to space (viewed from the x-y plane). Lighter shades corresponding to lower light intensity, while darker shades correspond to higher light intensity. A cross-sectional profile 1102 of the lighting pattern (e.g., along the x direction). In this example, the lighting pattern 110 irradiates a central portion 1102 with lower intensity light, while irradiating peripheral portions 1104 with higher intensity light (e.g., according to a curved profile pattern). This can be beneficial, as a polymer film often accumulates more stress at its center than along its edges (e.g., due to the lack of surrounding reflowable polymer material to compensate for the shrinkage). Accordingly, exposing the central portion of the polymer film to less intense light compared to its edges (e.g., to slow the rate of polymerization) can reduce the amount of accumulated stress, and improve the consistency of the polymer film. Although an example pattern is shown in FIG. 11A, this is merely an illustrative example. In practice, a lighting pattern can have different spatial patterns, depending on the implementation.

Further, in some cases, photocurable material can be cured by irradiating different portions of the photocurable material with light in sequence. For example, certain portions of the photocurable material can be irradiated with light first, followed by other portions of the photocurable material. This can be useful, for example, in controlling the rate of polymerization photocurable material in localized areas in particular sequence to regulate the built up of heat and/or stress.

As an example, FIG. 11B shows a lighting pattern 1150 having five zones 1152*a-e* arranged in a concentric pattern. In this example, a photocurable material can be cured by first irradiating the photocurable material using along a central portion 1152*a*, then along the ring portion 1152*b*, then along the ring portion 1152*c*, then along the ring portion 1152*d*, and finally along the ring portion 1152*e* in a sequence (e.g., such that a center of the photocurable material is cured first, and the edges of the photocurable material are cured last). This is beneficial, for example, as provides lateral shrinkage compensation (e.g., along the x-y plane) through the surrounding reflowable polymer material. A sequential pattern of radiation can be achieved, for example, using individually addressable light source arrays (e.g., one or more arrays of light emitting diodes), UV optics, grey-scale UV windows, UV masks, iris shutters, among others. Although an example pattern is shown in FIG. 11B, this is merely an illustrative example. In practice, a lighting pattern can include any number of different zones that are illuminated in any order during the casting process.

Further, although several different techniques are shown and described above, these techniques is not mutually exclusive. In practice, any number of these techniques can be used in conjunction to regulate the build up of stress in a polymer product to improve the consistency of the polymer product. As an example, a polymer product can be produced by controlling the relative space between molds structures before, during, and after casting (e.g., as described with respect to FIGS. 6A, 6B, and 7), irradiating photocurable material according to lighting patterns having different spatial and/or distributions and/or temporal characteristics (e.g., as described with respect to FIGS. 8A-8C, 9, 10, 11A, and 11B), either individually or in any combination.

Figure 12B:
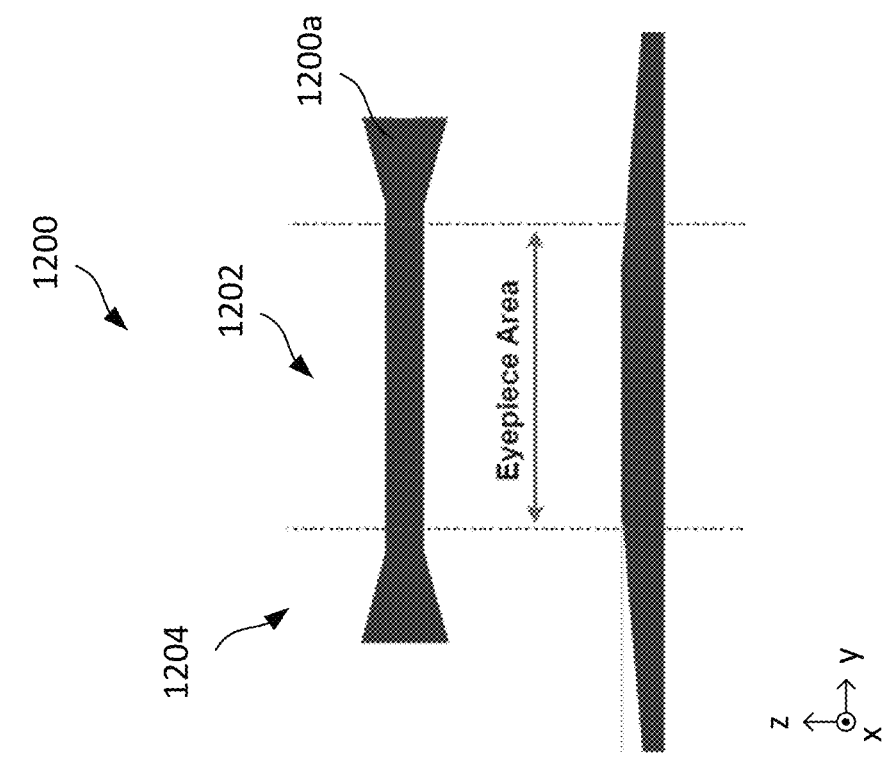
FIGS. 12A and 12B are diagrams of example polymer products.
Figure 12A:
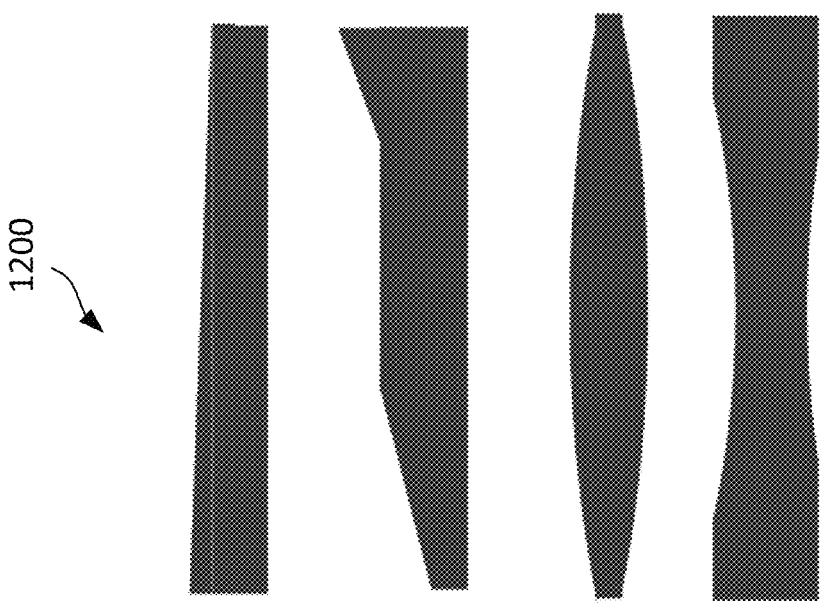

Further, one or more of these techniques can be used to produce polymer products having particular shapes. As examples, several different polymer products 1200 are shown in cross section in FIGS. 12A and 12B. For instance, as shown in FIG. 12A, polymer products 1200 can have asymmetric cross-sectional configurations or asymmetric cross-sectional configurations. In some cases, a polymer product 1200 can have one or more convex surfaces when viewed in cross-section. In some cases, a polymer product 1200 can have one or more concave surfaces when viewed in cross-section. Further, as shown in FIG. 12B, a polymer product 1200 can have a central eyepiece area 1202 (e.g., an optical portion to receive and transmit light), and a support portion 1204 (e.g., a radially peripheral portion providing structural support for the eyepiece area). These arrangements can be achieved using one or more of the technique described herein.

As an example, the polymer product 1200*a* can be produced by combining the techniques shown and described with respect to FIGS. 11A and 11B. For example, a photocurable material can be initially irradiated (e.g., with UV light) according to the portions 1152*a-d* of the lighting pattern 1150 in conjunction. Further, the spatial distribution of light intensity can be set according to the lighting pattern 1100 (e.g., such that the central portion 1102 of the photocurable material is irradiated with lower intensity light, and the peripheral portions 1004 are irradiated with progressively higher intensity light according to a curved profile pattern). This results in a flat central eyepiece area 1202. Subsequently, the photocurable material can be irradiated (e.g., with UV light) according to the portion 1152*e* of the lighting pattern 1150 (e.g., along the periphery of the polymer product) with a substantially lower light intensity (e.g., a lower than the lighting intensity of the portions 1152*a-d*). This results in a thicker support portion 1204 along the periphery of the polymer product.

Figure 13A:
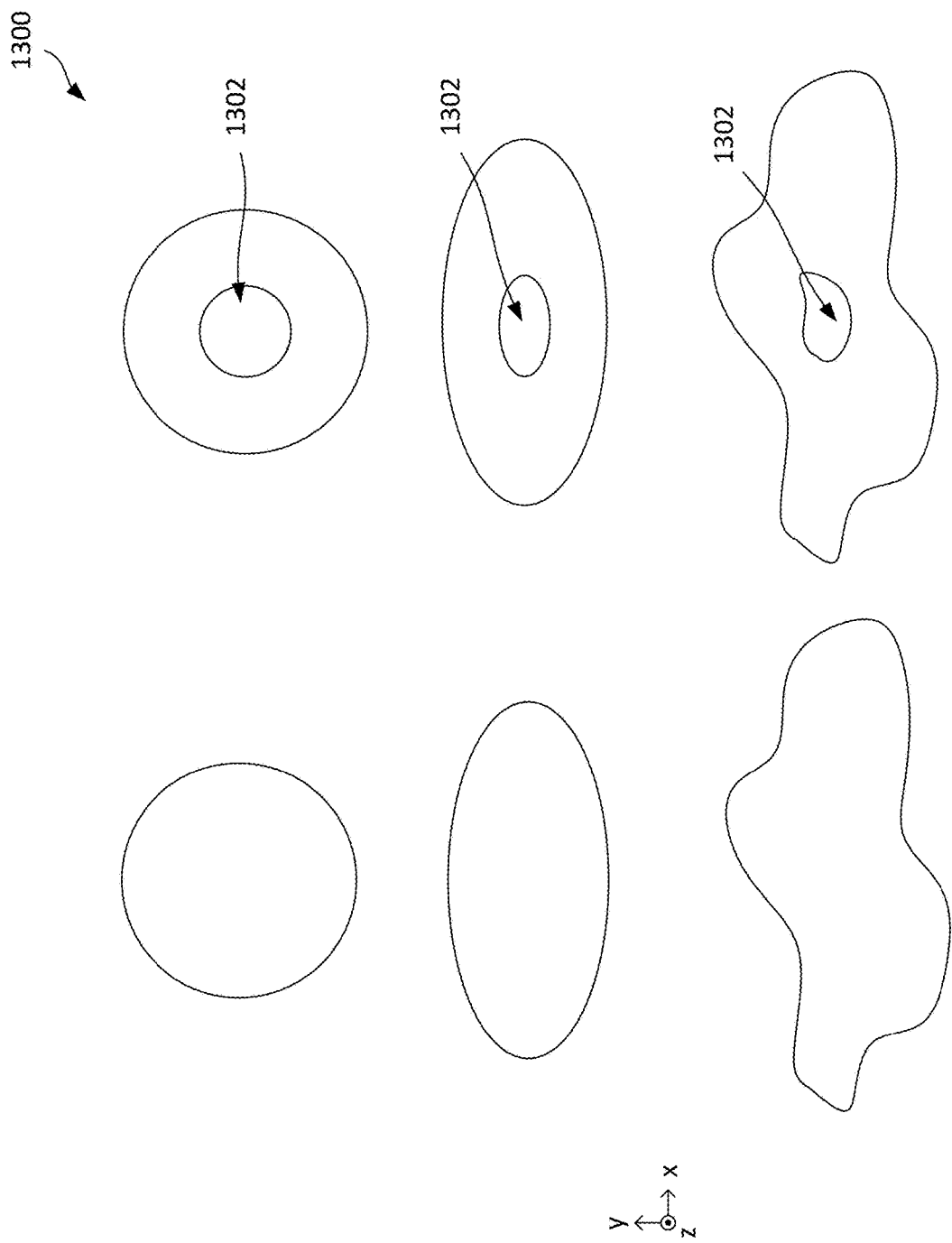
FIG. 13A is a diagram of example polymer products.

The planar shape of a polymer product (e.g., in the x-y plane) can also vary, depending on the implementation. As examples, several different polymer products 1300 are shown in plan view (e.g., viewed from the x-y plane) in FIG. 13. As shown in FIG. 13A, polymer products 1300 can have asymmetric configurations or asymmetric configurations with respect to the x-y plane. In some cases, a polymer product 1300 can have a circular or substantially circular shape with respect to the x-y plane. In some cases, a polymer product 1300 can have an ovular or substantially ovular shape with respect to the x-y plane. In some cases, a polymer product 1300 can have an arbitrary or amorphous shape (e.g., having one or more edges or curves) with respect to the x-y plane. Other shapes are also possible, depending on the implementation.

Further, a polymer product 1300 can include one or more apertures 1302 (e.g., an absence of void region enclosed, at least in part, by polymer material). The planar shape of an aperture can also vary, depending on the implementation. As shown in FIG. 13A, apertures 1302 can have asymmetric configurations or asymmetric configurations with respect to the x-y plane. In some cases, an aperture 1302 can have a circular or substantially circular shape with respect to the x-y plane. In some cases, an aperture 1302 can have an ovular or substantially ovular shape with respect to the x-y plane. In some cases, an aperture 1302 can have an arbitrary or amorphous shape (e.g., having one or more edges or curves) with respect to the x-y plane. Other shapes are also possible, depending on the implementation.

In some implementations, a polymer product 1300 and its aperture 1302 can have a common shape (e.g., a circular polymer product defining a circular aperture). In some implementations, a polymer product 1300 and its aperture 1302 can have different respective shapes (e.g., a circular polymer product defining an ovular aperture). Other combinations of polymer product shapes and aperture shapes are also possible, depending on the implementation.

The aperture 1302 can be defined in various ways. As an example, polymer material can be deposited onto a first mold according to a particular pattern (e.g., a pattern with a void region having a planar shape similar to or the same as the desired planar shape of the aperture). When the first mold is brought together with a second mold, the polymer material spreads between the molds, forming a shape with a void region. The polymer material is subsequently cured to form a polymer product.

As another example, a first mold can include a spacer structure mounted to its surface (e.g., a spacer structure having a planar shape similar to or the same as the desired planar shape of the aperture). The polymer material is deposited onto the first mold such that it flows around the spacer structure, thereby forming a void region around the spacer structure. When the first mold is brought together with a second mold, the polymer material spread between the molds and along the periphery of the spacer structure. The polymer material is subsequently cured to form a polymer product.

As another example, polymer material can be deposited onto a first mold. The first mold can be brought together with a second mold having a spacer structure mounted to its surface (e.g., a spacer structure having a planar shape similar to or the same as the desired planar shape of the aperture), thereby forming a void region around the spacer structure. The polymer material is subsequently cured to form a polymer product.

In some implementations, one or more apertures 1302 can be defined during the molding and casting process, and can be retained in the final product (e.g., a polymer product for installation in an optical system). In some implementations, one or more apertures 1302 can be defined during the molding and casting process, and can be removed from the final product (e.g., by cutting or singulating the polymer product into one or more portions that do not include the apertures, prior to installing the portions into an optical system).

The apertures 1302 provide various technique benefits. For example, an aperture 1302 can be used as an alignment or registration guide during the manufacturing process. For instance, during metallization, stacking, and/or singulation processes, the aperture 1302 can act as a visual landmark to align one or more tools with respect to the polymer product. The alignment can be performed manually (e.g., by a user) or automatically (e.g., by a computer imaging system coupled to one or more control modules for controlling the orientation of a tool).

As another example, the presence of an aperture 1302 enables a polymer product to be gripped and manipulated along its inner surface (e.g., along the boundary of the aperture 1302), rather than along its outer surface (e.g., along the outer boundary of the polymer product). In some implementations, this enables polymer products to be handled while better preserving the physical integrity of the polymer product (e.g., lessening or reducing bends or folds).

Figure 13C:
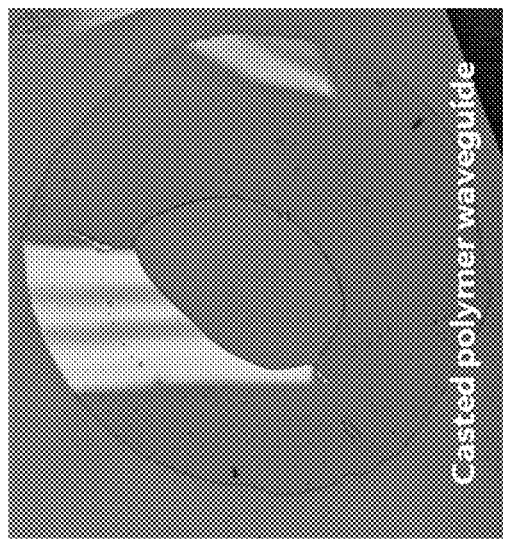
FIG. 13C is an image of an example polymer product formed after curing polymer material.
Figure 13B:
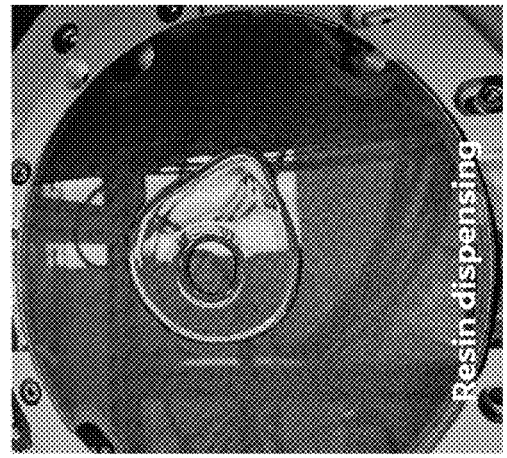
FIG. 13B is an image of an example deposition of polymer material on a mold.
Figure 13D:
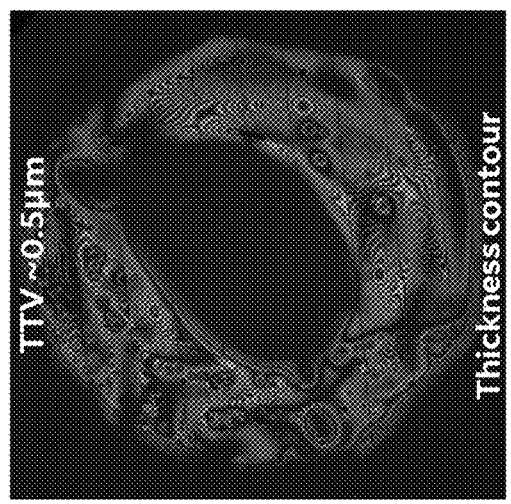
FIG. 13D is an image showing a thickness of a polymer product.

FIG. 13B shows an example deposition of polymer material (e.g., a photocurable resin) onto a mold. FIG. 13C shows an example polymer product formed after curing the polymer material. FIG. 13D shows the thickness of the polymer product. In the example shown in FIG. 13D, the polymer product exhibits a TTV of approximately 0.5 μm along a large portion of the polymer product (areas that are not directly adjacent to the aperture).

In some cases, a system 100 also include one or more heating elements to apply heat to a photocurable material during the curing process. This can be beneficial, for example, in facilitating the curing process. For instance, in some cases, both heat and light can be used to cure the photocurable material. For example, the application of heat can be used to accelerate the curing process, make the curing process more efficient, and/or make the curing processes more consistent. In some cases, the curing process can be performed using heat instead of light. For example, the application of heat can be used to cure the photocurable material, and a light source need not be used.

Figure 14:
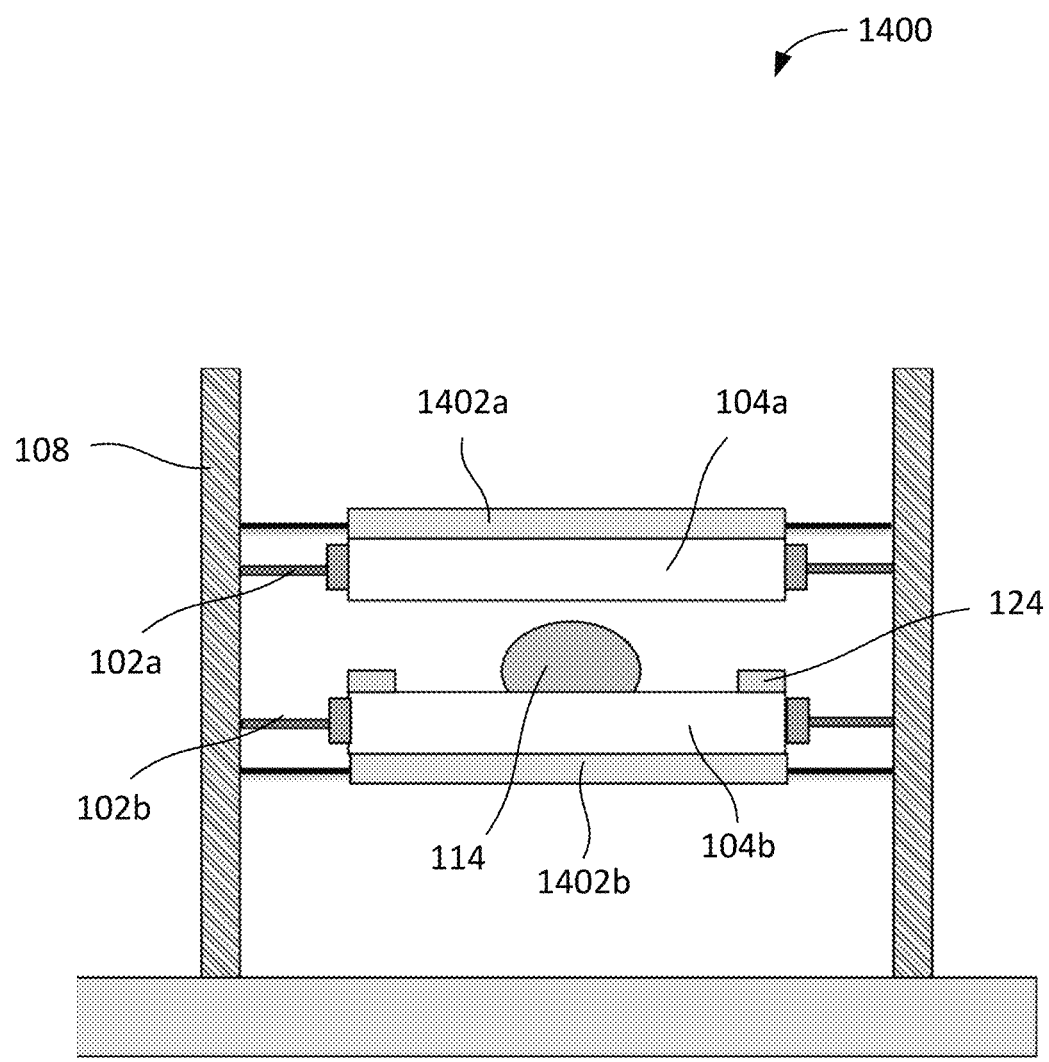
FIG. 14 is a diagram of another example system for producing polymer products.

An example system 1400 for producing polymer film is shown in FIG. 14. In general, the system 1400 can be similar to the system 100 shown in FIG. 1. For example, the system 1400 can include two actuable stages 102*a* and 102*b*, two mold structures 104*a* and 104*b*, a support frame 108, a control module 110, and a motor assembly 118. For ease of illustration, the control module 110 and the motor assembly 118 is not shown in FIG. 14.

However, in this example, the system 1400 does not include the two light sources 106*a* and 106*b*. Instead, it includes two heating elements 1402*a* and 1402*b*, positioned adjacent to the mold structures 104*a* and 104*b*, respectively. The heating elements 1402*a* and 1402*b* are configured to move with the mold structures 104*a* and 104*b* (e.g., through the actuable stages 102*a* and 102*b*), and are configured to apply heat to the photocurable material 114 between the mold structures 104*a* and 104*b* during the curing process.

The operation of the heating elements 1402*a* and 1402*b* can be controlled by the control module 110. For example, the control module 110 can be communicatively coupled to the heating elements 1402*a* and 1402*b*, and can selectively apply heat to the photocurable material 114 (e.g., by transmitting commands to the heating elements 1402*a* and 1402*b*).

Example heating elements 1402*a* and 1402*b* metal heating elements (e.g., nichrome or resistance wire), ceramic heating elements (e.g., molybdenum disilicide or PTC ceramic elements), polymer PTC heating elements, composite heating elements, or a combination thereof. In some cases, the heating elements 1402a and 1402b can include a metal plate to facilitate a uniform transfer heat to the mold structures 104a and 104b.

Although two heating elements 1402a and 1402b are shown in FIG. 14, in some cases, a system can include any number of heating elements (e.g., one, two, three, four, or more), or none at all. Further, although the system 1400 is shown without light sources 106a and 106b, in some cases, a system can include one or more light sources and one or more heating elements in conjunction.

Figure 15A:
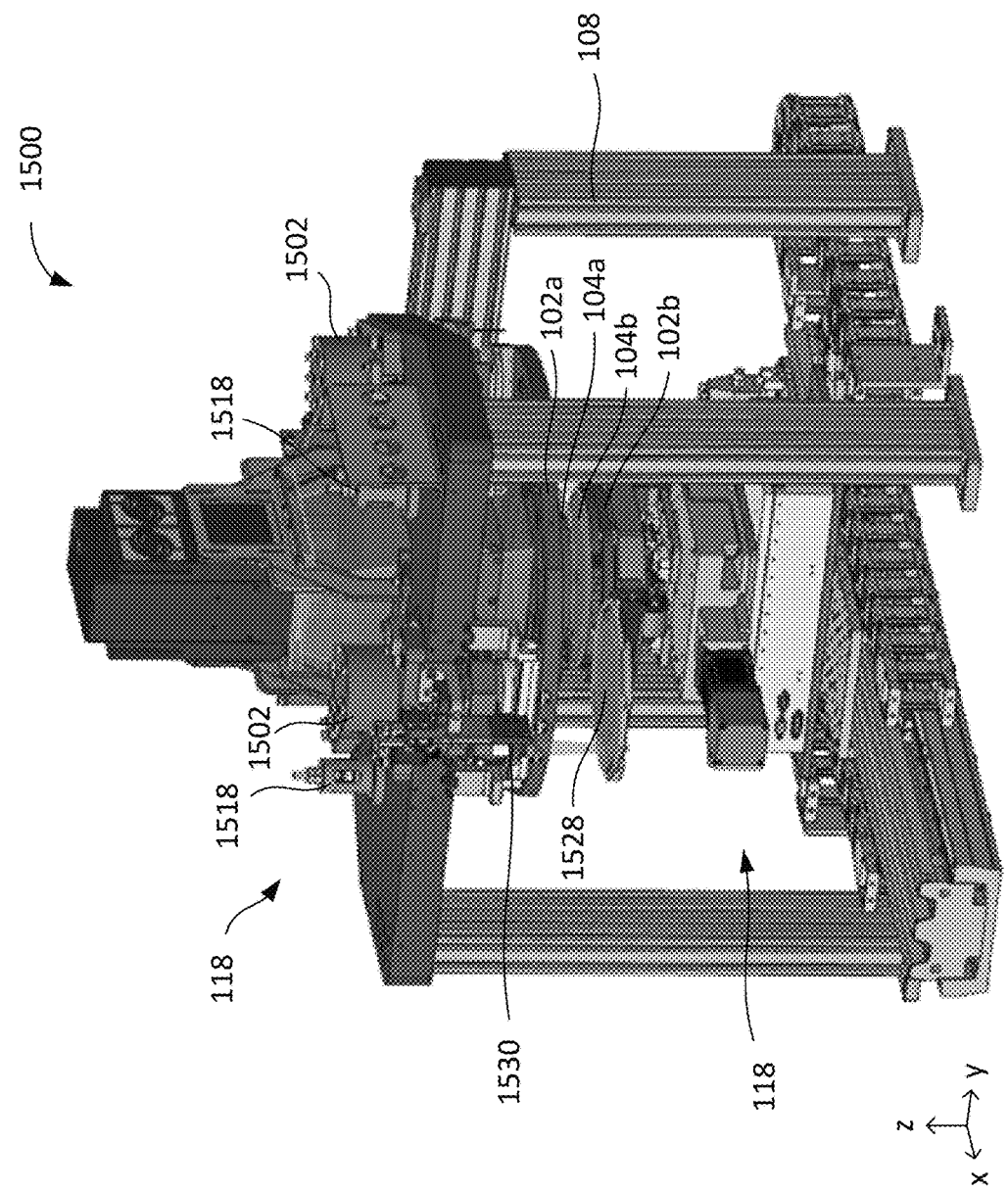
FIGS. 15A-15F are diagrams of another example system for producing polymer products.
Figure 15B:
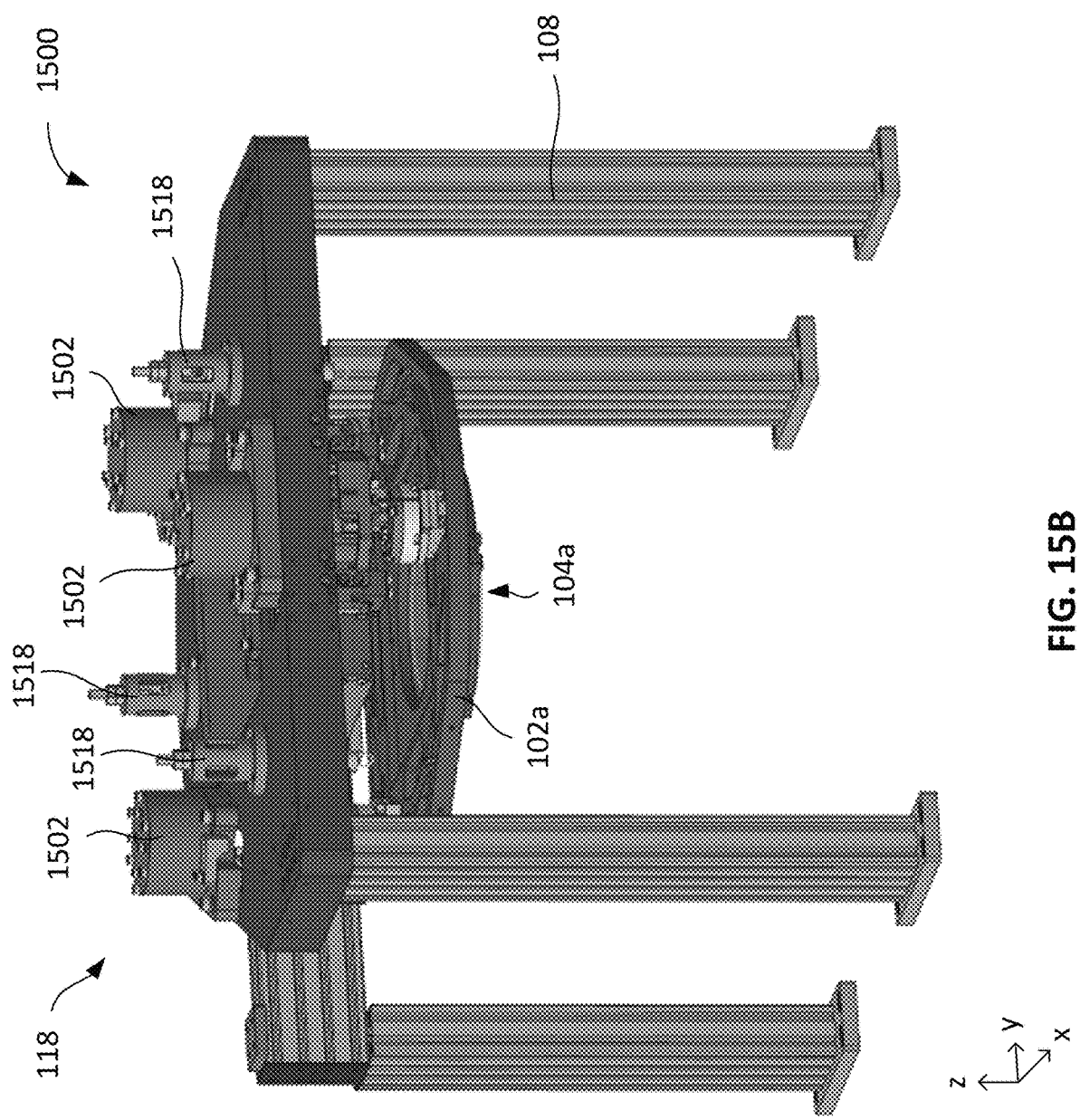
Figure 15C:
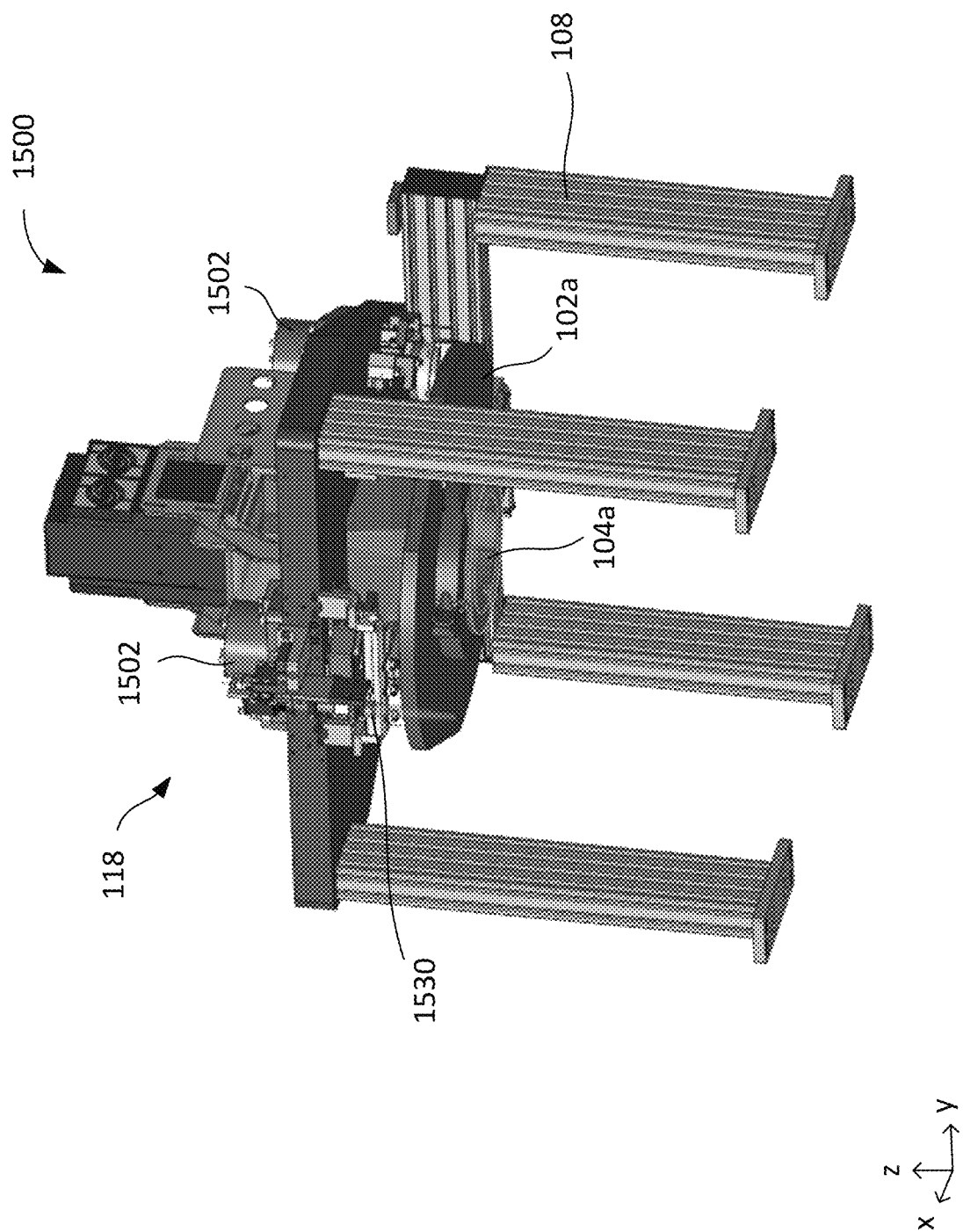
Figure 15D:
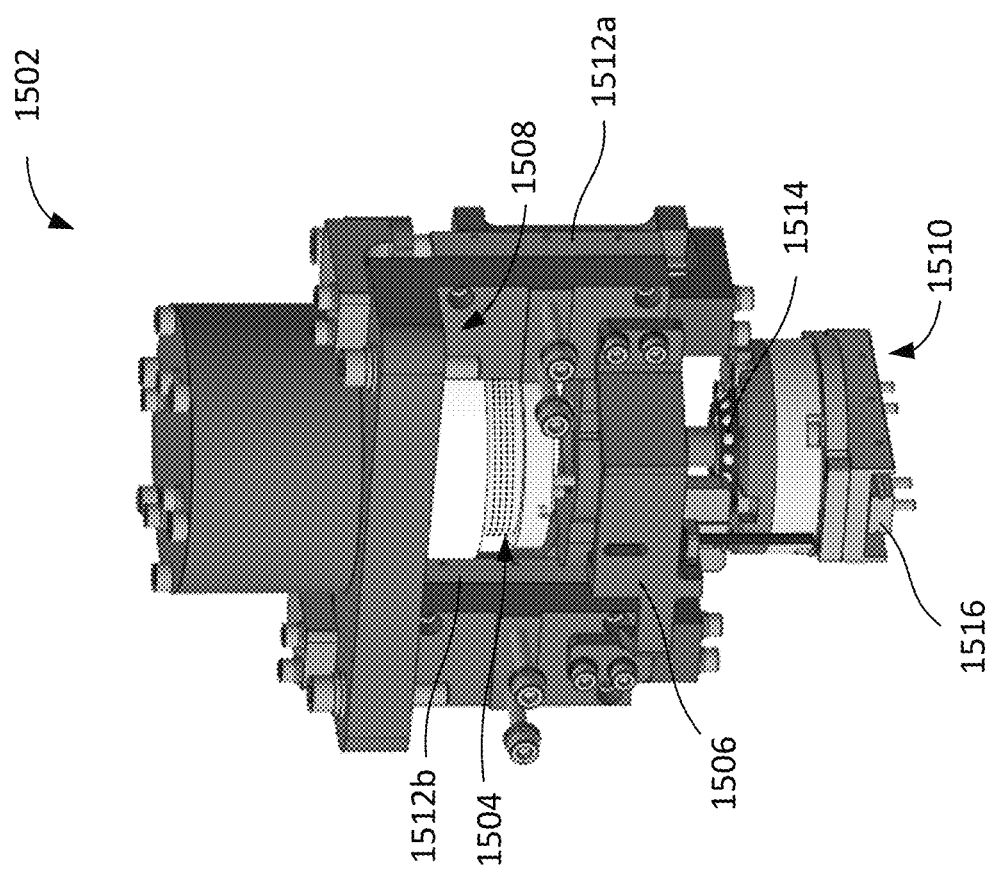
Figure 15E:
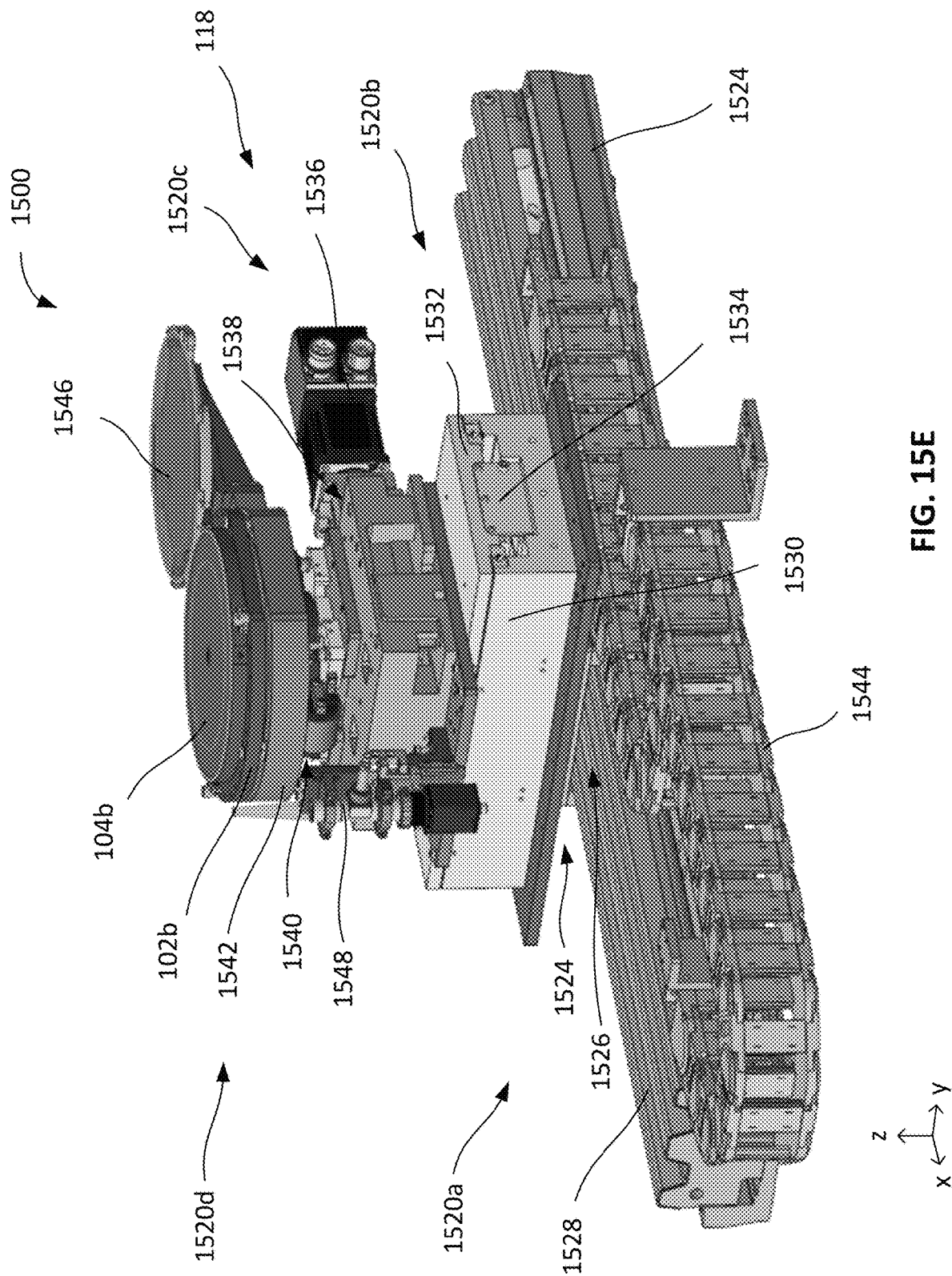
Figure 15F:
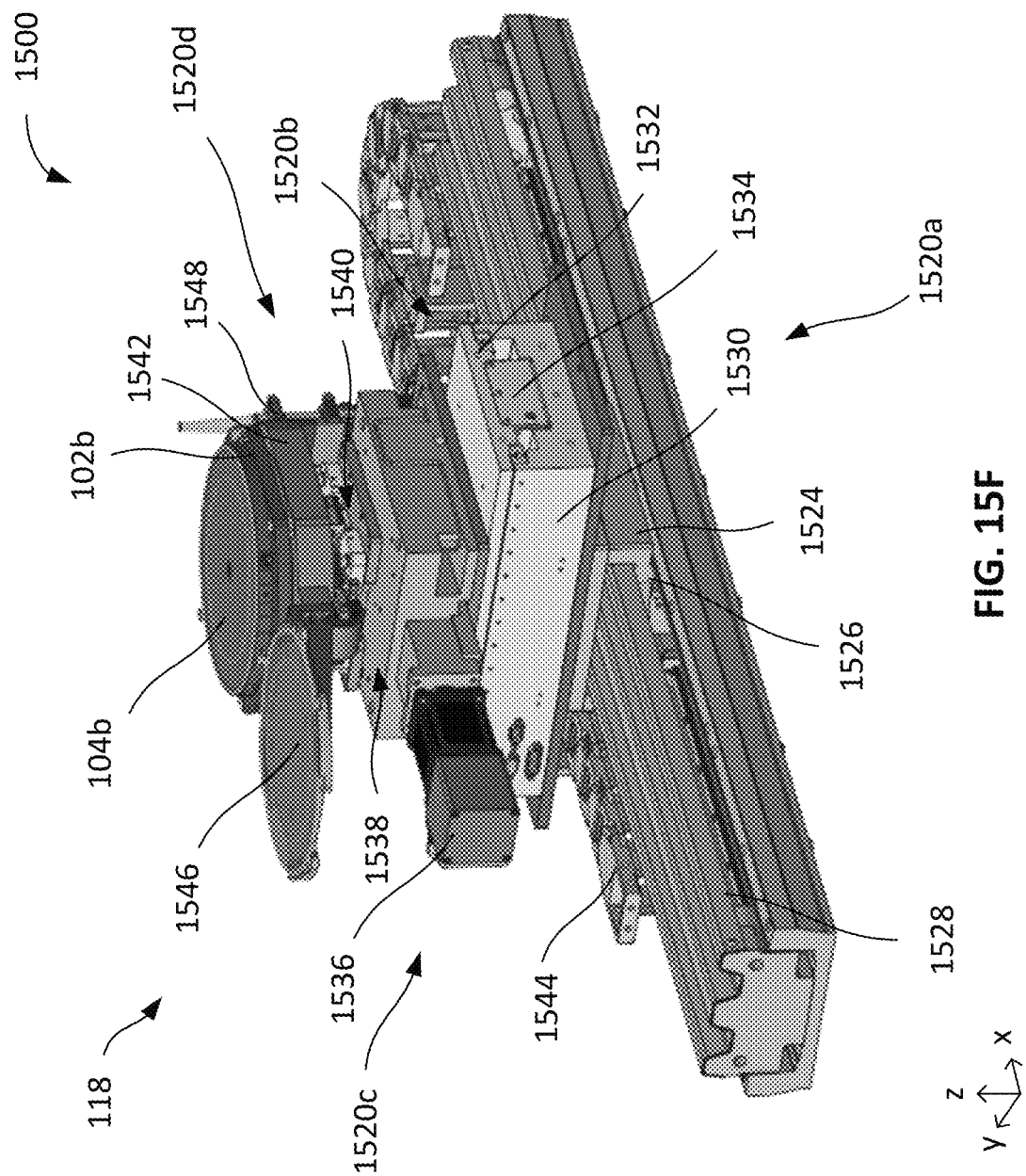

Another example system 1500 for producing polymer film is shown in FIGS. 15A-15F. FIG. 15A shows both an upper portion of the system 1500 (e.g., the portion of the system configured to manipulate an upper actuable stage) and a lower portion of the system 1500 (e.g., the portion of the system configured to manipulate a lower actuable stage). FIGS. 15B and 15C show the upper portion of the system 1500 from an elevated perspective and a sunken perspective, respectively. FIG. 15E shows an example motor used in the system 1500. FIGS. 15E and 15F show the lower portion of the system 1500 viewed from a front and rear perspective, respectively.

In general, the system 1500 can be similar to the systems 100 and 1400 shown in FIGS. 1 and 14, respectively. For example, the system 1500 can include two actuable stages 102a and 102b, two mold structures 104a and 104b, a support frame 108, a control module 110, a motor assembly 118, light sources 106a and 106b, and/or heating elements 1402a and 1402b. For ease of illustration, the control module 110, light sources 106a and 106b, and heating elements 1402a and 1402b are not shown in FIG. 15.

The system 1500 can manipulate the actuable stages 102b and 102b using the motor assembly 118 according to different respective degrees of freedom. For example, the system 1500 can be configured to translate the actuable stage 102a (e.g., the upper actuable stage) along the z-direction, and to rotate the actuable stage 102a about the x-axis and the y-axis (e.g., to "tip" or "tilt" the actuable stage 102a). However, the system 1500 can be configured to constrain translation of the actuable stage 102a along the y-direction and the x-direction, and to constrain rotation of the actuable stage 102 about the z-axis.

As another example, the system 1500 can be configured to translate the actuable stage 102b (e.g., the lower actuable stage) along the x-direction, the y-direction, and the z-direction, and to rotate the actuable stage 102a about the z-axis. However, the system 1500 can be configured to constrain rotation of the actuable stage 102b about the x-axis and the y-axis.

This configuration enables the system 1500 to align the actuable stage 102a and 102b relative to one another (e.g., to facilitate performance of the molding and casting process). Further, this can reduce the complexity of operating and maintaining the system (e.g., by reducing the degrees of freedom of the system to a limited subset). Nevertheless, in some implementations, the system 1500 can be configured to manipulate the actuable stage 102a and/or the actuable stage 102b according to six digress of freedom (e.g., translation along the x-direction, the y-direction, and the z-direction, and rotation about the x-direction, the y-direction, and the z-direction), or according to any subset of thereof.

As shown in FIGS. 15A-15C, the motor assembly 118 includes several motors 1502 to manipulate the actuable stage 102a. An example motor 1502 is shown in greater detail in FIG. 15D. The motor 1502 includes a voice coil 1504 (e.g., a coil of electrical wire), an optical linear encoder 1506 that tracks the vertical position (e.g., z-position) of certain components (e.g., components attached to the moving side of slide bearings 1512a and 1512b), a first mounting structure 1508 (e.g., for attachment to the support frame 108), and a second mounting structure 1510 (e.g., to attachment to the actuable stage 102). The control module 110 (e.g., as shown in FIG. 1) is configured to apply an electrical current to the voice coil 1504. This electric current induces a magnetic force through the voice coil 1504, which provides a motive force (e.g., pushing or pulling the mounting structures 1508 and 1510 of the motor 1502 away or towards each other). In some cases, the motor 1502 may be referred to as a linear motor.

The control module 110 can be configured to apply varying amount of electrical current to the voice coil 1504 to control actuation of the motor 1502. Further, the optical linear encoders 1506 of each of the motors 1502 and the control module 110 can operate in conjunction to manipulate the actuable stage 102a in different ways. For instance, the control module 110 can determine the position of each of the motors 1502 using the optical linear encoders 1506, and can apply different patterns of electrical current to each of the voice coils 1504 to translate and/or rotate the actuable stage 102a in different ways. As an example, the motors 1502 can be operated in unison to raise or lower the actuable stage 102a in the z-direction. As another example, the motors 1502 can be operated to selectively raise the actuable 102a stage at one or more points and/or to lower the actuable 102b stage at one or more other points selectively (e.g., to tip or tilt the actuable stage 102a).

The motor 1502 also includes various bearing to constrain the degrees of freedom of movement of the actuable stage 102b. For instance, in the example shown in FIG. 15B, the motor 1502 includes two bearing slides 1512a and 1512b on opposing ends of the motor 1502. The bearing slides 1512aa and 1512b enables translation of two opposing portions of the motor 1502 with respect to one another along the z-direction, but constrains translation along the x-direction and y-direction. Further, the motor 1502 includes a spherical bearing 1514. The spherical bearing 1514 provides an anchor point between two opposing portions of the motor, while allowing the two portions to rotate about the x-axis, the y-axis, and/or the z-axis relative to one another. Further, the motor 1502 includes an additional bearing slide 1516. The bearing slide 1516 enables translation of two opposing portions of the motor 1502 relative to one another along a lateral direction (e.g., in a direction along the x-y plane), but constrains translation along other lateral directions and the z-direction. In conjunction, these bearings constrain the degrees of freedom of actuation of the motor 1502. Further, when operated in conjunction, the motors 1502 can manipulate the actuable stage 102b according to specific degrees of freedom (e.g., as described above).

The system 1500 can also include one or more spring mechanism to bias the actuable stage 102a towards a particular position. This can be useful, for example, in reducing the load of the actuable stage 102a on the motors 1502. For example, referring to FIGS. 15A-15C, the system 1500 can include a number of spring mechanisms 1518 distributed along the support frame 108. Each spring mechanism 1518 is physically coupled to the support frame 108 and the actuable stage 102a, and biases the actuable stage 102a towards the support frame 108 (e.g., through the application of a spring force between them, against the force of gravity). In some implementations, the force applied by the spring mechanisms 1518 can be selected such that the actuable stage 102a rests in a particular position absent the application of force by the motors 1502 (e.g., an idle position).

As shown in FIGS. 15E and 15F, the lower portion of the system 1500 includes several mechanisms for manipulating the actuable stage 102b and the mold 104b. In some implementations, these mechanisms can be configured to translate the actuable stage 102b and the mold 104b in the x-direction, the y-direction, and the z-direction, and to rotate the actuable stage 102b and the mold 104b. about the z-axis.

For example, the lower portion of the system 1500 includes a first translation sub-stage 1520a configured to translate the actuable stage 102b and the mold 104b in the x-direction. The first translation sub-stage 1520a includes a linear motor 1524, a sled 1526 (upon which other components of the lower portion of the system 1500, including the sub-stages 1520b-1520d described below, are mounted), and a track 1528. The control module 110 is configured to apply electrical current to the linear motor 1524, which causes the sled 1526 to translate along the track 1528 (e.g., to translate the actuable stage 102b and the mold 104b in the x-direction). The control module 110 can determine the position of the sled 1526 on the track 1528 using one or more feedback sensors (e.g., optical linear encoders, cameras, position sensors, etc.).

As another example, the lower portion of the system 1500 includes a second translation sub-stage 1520b configured to translate the actuable stage 102b and the mold 104b in the y-direction. The first translation sub-stage 1520b includes a linear motor 1530, a sled 1532 (upon which other components of the lower portion of the system 1500, including the sub-stages 1520c and 1520d described below, are mounted), and a track 1534. The control module 110 is configured to apply electrical current to the linear motor 1530, which causes the sled 1532 to translate along the track 1534 (e.g., to translate the actuable stage 102b and the mold 104b in the y-direction). The control module 110 can determine the position of the sled 1532 on the track 1534 using one or more feedback sensors (e.g., encoders, cameras, position sensors, etc.).

As another example, the lower portion of the system 1500 includes a third translational sub-stage 1520c configured to translate the actuable stage 102b and the mold 104b along the z-axis. The third translational sub-stage 1520c includes a linear motor 1536, and a platform 1538 (upon which other components of the lower portion of the system 1500, including the sub-stage 1520d described below, are mounted). The control module 110 is configured to apply electrical current to the linear motor 1536, which causes the platform 1538 to translate along the z-direction. The control module 110 can determine the position of the platform 1538 using one or more feedback sensors (e.g., encoders, cameras, position sensors, etc.).

As another example, the lower portion of the system 1500 includes a fourth rotational sub-stage 1520d configured to rotate the actuable stage 102b and the mold 104b about the z-axis. The fourth rotational sub-stage 1520d includes a rotary motor 1540 and a platform 1542 (upon which other components of the lower portion of the system 1500, including the actuable stage 102b and the mold 104b, are mounted), The control module 110 is configured to apply electrical current to the rotary motor 1540, which causes the platform 1542 to rotate about the z-direction. The control module 110 can determine the position of the platform 1542 using one or more feedback sensors (e.g., encoders, cameras, position sensors, etc.).

As shown in FIG. 15F, the lower portion of the system 1500 can also include a cable chain 1544 to manage the cabling and wiring of the system 1500. For example, cables and wires (e.g., those electrically coupling the components of the lower portion of the system 1500 to other components of the system 1500) can be routed through the cable chain 1544. As the components of the system 1500 move relative to one another (e.g., as the sled 1526 moves along the track 1528), the cable chain 1544 bends or straightens to track the movement of those components, while keeping the cables or wires together in a bundle.

In some implementations, the system 1500 can include one or more additional stages. This can be useful, for example, as it allows the system 1500 to handle additional materials or objects concurrently. For example, as shown in FIGS. 15A, 15E, and 15F, the lower portion of the system 1500 can include an additional stage 1546 positioned adjacent to and mechanically coupled to the actuable stage 102b. The additional stage 1546 can be used to handle materials and/or objects associated with the molding and casting process. For example, after a polymer material has been cured into a film, the film can be removed (e.g., peeled) from the molds and deposited onto the additional stage 1546 for further processing or use.

In some implementations, the system 1500 can include one or more visual sensors (e.g., photodetectors, cameras, etc.) for determining the relative alignment between the components of the system 1500. For instance, the system 1500 can include one or more fiducial markers (e.g., visually distinctive markings, patterns, etc.) positioned on one or more components of the system. Further, the system 1500 can include one or more visual sensors configured to detect any fiducial markers that come into view, and transmit information regarding detected fiducial markers to the control module 110. This information can include data such as the time that the fiducial marker was detected, the location that the fiducial market was detected, the type of fiducial marker that was detected, an estimated distance between the fiducial marker and the visual sensor, etc. Using this information, the control module 110 can determine the position of the visual sensors relative to the fiducial markers, and determine the relative position one of component of the system relative to another. As an example, as shown in FIGS. 15A, 15B, 15E and 15F, the system can include multiple visual sensors 1548, each facing a different portion of the system. The control module 110 can gather sensor data from the visual sensors 1548 regarding the movement and position of various portions of the system 1500, and control the operation of the system based on the feedback. This can be useful, for example, in enabling the system 1500 to be controlled according to a greater degree of precision.

Figure 17:
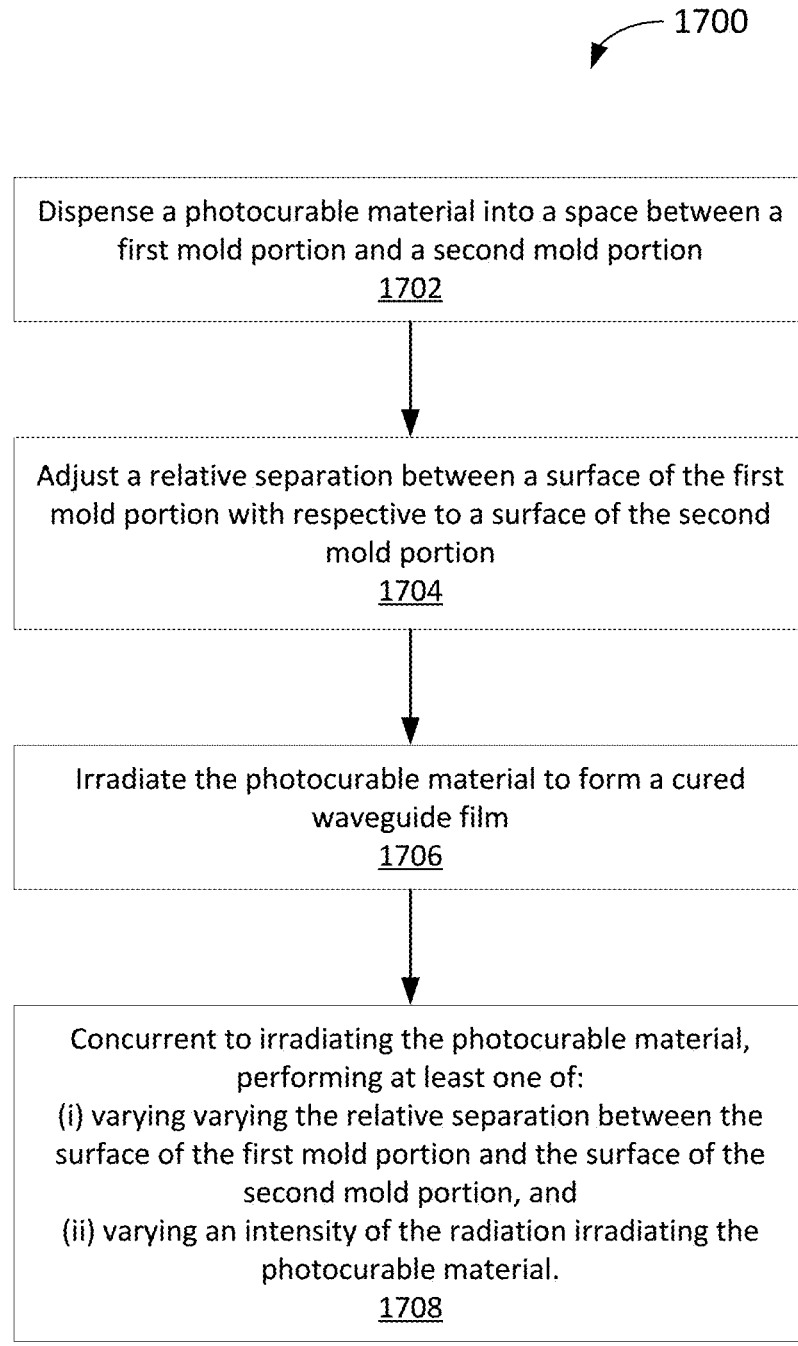
FIG. 17 is a flow chart diagram of an example process for producing a polymer product.

FIG. 17 shows an example process 1700 for forming a waveguide film. The process 1700 can be performed, for example, using the systems 100, 1400, or 1500. In some cases, the process 1700 can be used to produce polymer films suitable for use in optical applications (e.g., as a part of waveguides or eyepieces in an optical imaging system). In some cases, the process can be particularly useful for producing waveguides or eyepieces suitable for use in a headset. For instance, the process can be used to produce waveguides or eyepieces having a thickness and/or cross-sectional area that are sufficient to guide light and project light covering a field of view of a headset wearer. As an example, the process can be used to produce polymer products having a thickness of no more than 1000 µm (e.g., as measured along the z-axis of a Cartesian coordinate system), such as 800 µm or less, 600 µm or less, 400 µm or less, 200 µm or less, 100 µm or less, or 50 µm or less, and an area of at least 1 cm$^2$ (e.g., as measured with respect an x-y plane of the Cartesian coordinate system), such as 5 cm$^2$ or more, 10 cm$^2$ or more, such as up to about 100 cm$^2$ or less, and having a predetermined shape. In certain cases, the polymer film can have a dimension of at least 1 cm (e.g., 2 cm or more, 5 cm or more, 8 cm or more, 10 cm or more, such as about 30 cm or less) in at least one direction in the x-y plane. As another example, the process can be used to produce polymer products having a thickness between 10 μm to 2 mm and an area as large as 1000 cm$^2$ (e.g., a circular polymer product having a diameter of approximately 18 cm.

In the process 1700, a photocurable material is dispensed into a space between a first mold portion and a second mold portion opposite the first mold portion (step 1702). Example systems including mold portions are described, for example, with respect to FIG. 1.

A relative separation between a surface of the first mold portion with respect to a surface of the second mold portion opposing the surface of the first mold portion is adjusted (step 1704). In some cases, the relative separation can be adjusted so that at least a portion the space filled with the photocurable material has a predetermined shape. In some cases, the relative separation can be adjusted so that at least a portion the space filled with the photocurable material has a thickness of no more than 1000 μm, an area of at least 1 cm$^2$. In some cases, the relative separation can be adjusted so that at least a portion the space filled with the photocurable material has a thickness between 10 μm to 2 mm and an area as large as 1000 cm$^2$. Example systems for adjusting the positions of mold portions are described, for example, with respect to FIG. 1.

In some cases, varying the relative separation can include oscillating the position of the first mold portion relative to the second mold portion. Example oscillation techniques are described, for example, with respect to FIG. 7.

The photocurable material in the space is irradiated with radiation suitable for photocuring the photocurable material to form a cured waveguide film (step 1706). Example systems for irradiating photocurable material are described, for example, with respect to FIG. 1.

Concurrent to irradiating the photocurable material, at least one of the following is performed: (i) varying the relative separation between the surface of the first mold portion and the surface of the second mold portion, and varying an intensity of the radiation irradiating the photocurable material (step 1708).

In some cases, the relative separation can be varied to regulate a force experienced by the first mold portion along an axis extending between the first mold portion and the second mold portion. In some cases, the relative separation can be varied based on a closed-loop control system that regulates the force. Example closed loop systems are described, for example, with respect to FIG. 6A.

In some cases, the relative separation can be varied after irradiating the photocurable material for a time sufficient to reach a gel point in the photocurable material. In some cases, the relative separation can be reduced after irradiating the photocurable material for the time sufficient to reach the gel point in the photocurable material.

In some cases, varying the relative separation can include moving the first mold portion towards the second mold portion to compress one or more spacer structures disposed between the first mold portion and the second mold portion. In some cases, the spacer structures can be compressed according to an open-loop control system. Example open loop systems are described, for example, with respect to FIG. 6B.

In some cases, varying the intensity of the radiation can include varying a spatial intensity pattern irradiating the photocurable material. Example spatial intensity patterns of radiation are described, for example, with respect to FIG. 11A.

In some cases, varying the intensity of the radiation can include varying a power of the radiation. Varying the power can include pulsing the radiation. In some cases, each pulse of the radiation can have the same power. In some cases, pulses of the radiation can have different power. In some cases, each pulse of the radiation can have the same duration. In some cases, pulses of the radiation can have different durations. In some cases, a pulse frequency can be constant. In some cases, a pulse frequency can be varied. Example pulse patterns of radiation are described, for example, with respect to FIGS. 9 and 10.

In some cases, varying the intensity of the radiation can include sequentially irradiating different areas of the space. Example sequential patterns of radiation are described, for example, with respect to FIG. 11B.

In some cases, the thickness of the space filled with photocurable material varies and the intensity of the radiation can be varied so that regions of high relative thickness receive a higher radiation dose compared to regions of low relative thickness.

In some cases, the process can further include separating the cured waveguide film from the first mold portion and the second mold portion.

In some cases, the process can include assembling a head mounted display comprising the waveguide film formed using the process described herein.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the control module 110 can be implemented using digital electronic circuitry, or in computer software, firmware, or hardware, or in combinations of one or more of them. In another example, the process 1700 shown in FIG. 17 can be implemented, at least in part, using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 18:
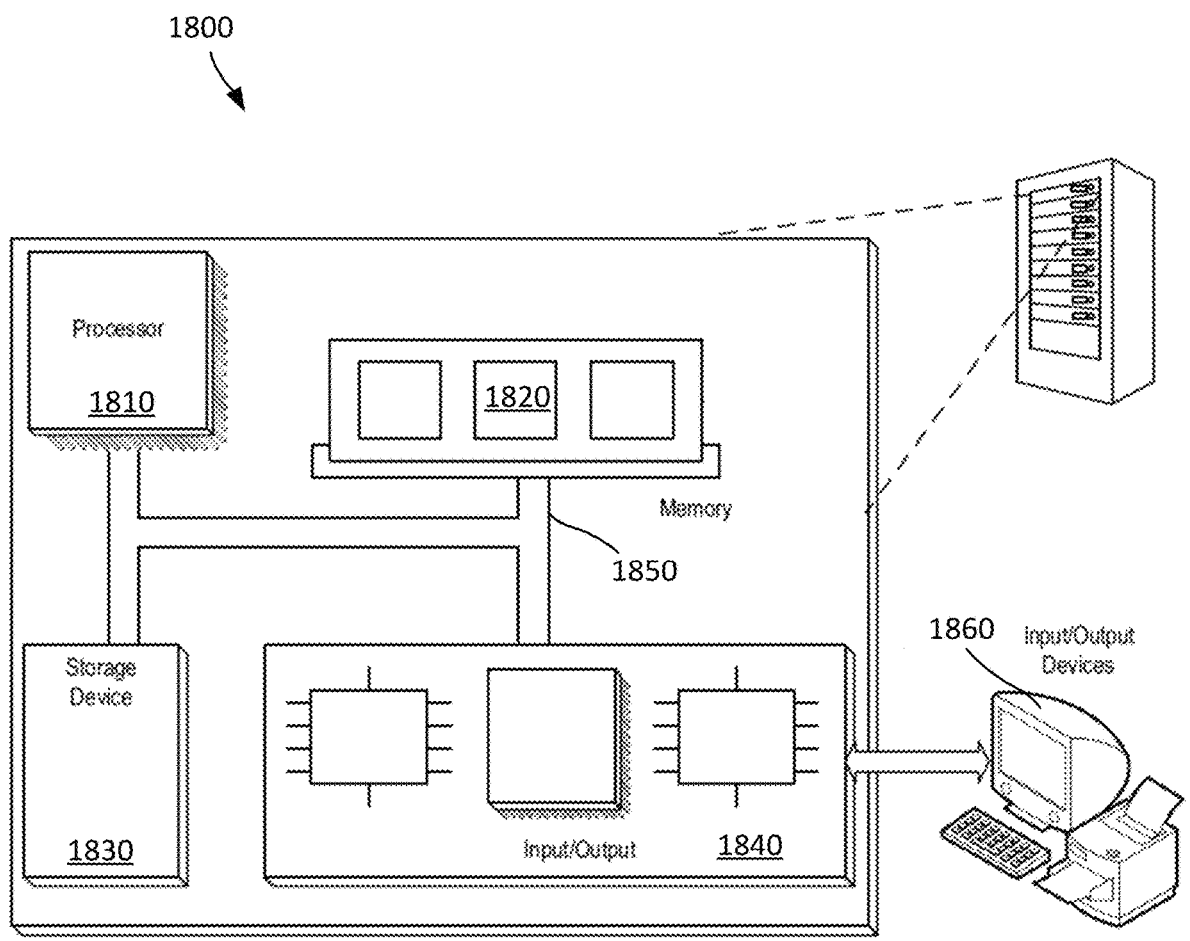
FIG. 18 is a diagram of an example computer system.

FIG. 18 shows an example computer system 1800 that includes a processor 1810, a memory 1820, a storage device 1830 and an input/output device 1840. Each of the components 1810, 1820, 1830 and 1840 can be interconnected, for example, by a system bus 1850. The processor 1810 is capable of processing instructions for execution within the system 1800. In some implementations, the processor 1810 is a single-threaded processor, a multi-threaded processor, or another type of processor. The processor 1810 is capable of processing instructions stored in the memory 1820 or on the storage device 1830. The memory 1820 and the storage device 1830 can store information within the system 1800.

The input/output device 1840 provides input/output operations for the system 1800. In some implementations, the input/output device 1840 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 1860. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A system comprising:
a first mold structure;
a second mold structure, wherein the first mold structure and second mold structure are configured to receive a photocurable material a space between the first mold structure and a second mold structure;
an actuable stage coupled to at least one of the first mold structure or the second mold structure;
a light source; and
a control module, wherein the control module is configured to:
adjust, using the actuable stage, a relative separation between a surface of the first mold structure with respect to a surface of the second mold structure opposing the surface of the first mold structure,
irradiate, using the light source, the photocurable material in the space with radiation suitable for photocuring the photocurable material to form a cured waveguide film, and
concurrent to irradiating the photocurable material, varying, using the actuable stage, the relative separation between the surface of the first mold structure and the surface of the second mold structure, wherein the control module is configured to vary the relative separation to regulate a force experienced by the first mold structure along an axis extending between the first mold structure and the second mold structure.

2. The system of claim 1, wherein the control module is configured to vary the relative separation based on a closed-loop control system that regulates the force.

3. The system of claim 1, further comprising one or more spacer structures disposed between the first mold structure and the second mold structure,
wherein the control module is configured to vary the relative separation by moving the first mold structure towards the second mold structure to compress the one or more spacer structures.

4. The system of claim 3, wherein the control module is configured to compress the one or more spacer structures according to an open-loop control system.

5. The system of claim 1, wherein the control module is configured to:
concurrent to irradiating the photocurable material, vary, using the light source, an intensity of the radiation irradiating the photocurable material, wherein the control module is configured to vary the intensity of the radiation by varying a spatial intensity pattern irradiating the photocurable material.

6. The system of claim 1, wherein the control module is configured to
concurrent to irradiating the photocurable material, vary, using the light source, an intensity of the radiation irradiating the photocurable material, wherein the control module is configured to vary the intensity of the radiation by varying a power of the radiation.

7. The system of claim 6, wherein the control module is configured to vary the power by pulsing the radiation.

8. The system of claim 7, wherein the control module is configured to pulse the radiation such that each pulse of the radiation has the same power.

9. The system of claim 7, wherein the control module is configured to pulse the radiation such that the pulses of the radiation have different power.

10. The system of claim 7, wherein the control module is configured to pulse the radiation such that each pulse of the radiation has the same duration.

11. The system of claim 7, wherein the control module is configured to pulse the radiation such that the pulses of the radiation have different durations.

12. The system of claim 7, wherein the control module is configured to pulse the radiation according to a constant pulse frequency.

13. The system of claim 7, wherein the control module is configured to pulse the radiation according to a variable pulse frequency.

14. The system of claim 1, wherein the control module is configured to:
concurrent to irradiating the photocurable material, vary, using the light source, an intensity of the radiation irradiating the photocurable material, wherein the control module is configured to vary the intensity of the radiation by sequentially irradiating different areas of the space.

15. The system of claim 1, wherein the control module is configured to vary (i) the thickness of the space filled with photocurable material and (ii) the intensity of the radiation such that regions of high relative thickness receive a higher radiation dose compared to regions of low relative thickness.

16. A system comprising:
a first mold structure;
a second mold structure, wherein the first mold structure and second mold structure are configured to receive a photocurable material a space between the first mold structure and a second mold structure;
an actuable stage coupled to at least one of the first mold structure or the second mold structure;
a light source; and
a control module, wherein the control module is configured to:
adjust, using the actuable stage, a relative separation between a surface of the first mold structure with respect to a surface of the second mold structure opposing the surface of the first mold structure;
irradiate, using the light source, the photocurable material in the space with radiation suitable for photocuring the photocurable material to form a cured waveguide film; and
concurrent to irradiating the photocurable material, vary, using the actuable stage, the relative separation between the surface of the first mold structure and the surface of the second mold structure, wherein the control module is configured to vary the relative separation after irradiating the photocurable material for a time sufficient to reach a gel point in the photocurable material.

17. A system comprising:
a first mold structure;
a second mold structure, wherein the first mold structure and second mold structure are configured to receive a photocurable material a space between the first mold structure and a second mold structure;
an actuable stage coupled to at least one of the first mold structure or the second mold structure;
a light source; and
a control module, wherein the control module is configured to:
adjust, using the actuable stage, a relative separation between a surface of the first mold structure with respect to a surface of the second mold structure opposing the surface of the first mold structure;

irradiate, using the light source, the photocurable material in the space with radiation suitable for photocuring the photocurable material to form a cured waveguide film; and concurrent to irradiating the photocurable material, vary, using the actuable stage, the relative separation between the surface of the first mold structure and the surface of the second mold structure, wherein the control module is configured to vary the relative separation by oscillating the position of the first mold structure relative to the second mold structure.

* * * * *